(12) United States Patent
Harlan et al.

(10) Patent No.: US 11,279,723 B2
(45) Date of Patent: Mar. 22, 2022

(54) METALLOCENE SYNTHESIS PROCESS

(71) Applicant: ExxonMobil Chemical Patents Inc., Baytown, TX (US)

(72) Inventors: Charles J. Harlan, Houston, TX (US); Matthew W. Holtcamp, Huffman, TX (US); Subramaniam Kuppuswamy, Mont Belvieu, TX (US); Steven C. Haas, Manvel, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/252,980

(22) PCT Filed: Jun. 20, 2019

(86) PCT No.: PCT/US2019/038169
§ 371 (c)(1),
(2) Date: Dec. 16, 2020

(87) PCT Pub. No.: WO2020/009802
PCT Pub. Date: Jan. 9, 2020

(65) Prior Publication Data
US 2021/0246155 A1 Aug. 12, 2021

Related U.S. Application Data

(60) Provisional application No. 62/693,504, filed on Jul. 3, 2018.

(30) Foreign Application Priority Data

Aug. 31, 2018 (EP) ..................................... 18191970

(51) Int. Cl.
C07F 17/00 (2006.01)

(52) U.S. Cl.
CPC ..................................... *C07F 17/00* (2013.01)

(58) Field of Classification Search
CPC ....................................................... C07F 17/00
See application file for complete search history.

(56) References Cited

U.S. PATENT DOCUMENTS

| | | | |
|---|---|---|---|
| 5,359,105 A | 10/1994 | Strickler et al. | 556/410 |
| 5,679,816 A | 10/1997 | Timmers et al. | 556/53 |
| 5,760,262 A | 6/1998 | DeSoto et al. | 556/11 |
| 5,831,106 A * | 11/1998 | Langhauser | C07F 17/00 556/11 |
| 6,177,376 B1 | 1/2001 | Fritz et al. | 502/110 |
| 6,242,545 B1 | 6/2001 | Jejelowo et al. | 526/160 |
| 6,248,845 B1 | 6/2001 | Loveday et al. | 526/113 |
| 6,528,597 B2 | 3/2003 | Loveday et al. | 526/113 |
| 6,936,675 B2 | 8/2005 | Szul et al. | 526/348.2 |
| 6,956,088 B2 | 10/2005 | Farley et al. | 526/113 |
| 7,172,816 B2 | 2/2007 | Szul et al. | 428/523 |
| 7,179,876 B2 | 2/2007 | Szul et al. | 526/348.2 |
| 7,193,099 B2 * | 3/2007 | Damrau | C07F 17/00 502/103 |
| 7,381,783 B2 | 6/2008 | Loveday et al. | 526/352 |
| 7,635,783 B2 * | 12/2009 | Chevalier | C08F 10/00 556/11 |
| 8,247,065 B2 | 8/2012 | Best et al. | 428/220 |
| 8,378,043 B2 | 2/2013 | Graham et al. | 526/170 |
| 8,476,392 B2 | 6/2013 | Kolb et al. | 526/328 |
| 9,290,593 B2 | 3/2016 | Cho et al. | C08F 210/14 |
| 2005/0182266 A1 * | 8/2005 | Schulte | C07C 13/465 556/11 |
| 2015/0291748 A1 | 10/2015 | Malakoff | C08J 5/18 |
| 2017/0320976 A1 | 11/2017 | Canich et al. | C08F 10/00 |
| 2018/0111953 A1 * | 4/2018 | Harlan | C08F 4/65925 |
| 2018/0282359 A1 * | 10/2018 | Crowther | C07F 17/00 |

FOREIGN PATENT DOCUMENTS

| | | | |
|---|---|---|---|
| EP | 0834514 | 10/2003 | ............. C07F 17/00 |
| EP | 2966096 | 4/2017 | ............. C08F 4/6592 |
| KR | 10-2018-0006319 | 1/2018 | ............. C08F 4/64 |
| WO | WO1996/019488 | 6/1996 | ............. C07F 17/00 |
| WO | WO1996/034002 | 10/1996 | ............. C07F 17/00 |
| WO | WO2017/105635 | 6/2017 | ............. C08F 4/6592 |
| WO | WO2018/151904 | 8/2018 | ............. C08F 210/16 |

OTHER PUBLICATIONS

CAS Abstract and Indexed Reaction, K. Kane et al., 16 Organometallics, 4567-4571 (1997) (Year: 1997).*
CAS Abstract and Indexed Reactions, A. Antiñolo et al., 694 Journal of Organometallic Chemistry, 1959-1970 (2009) (Year: 2009).*
K. Kane et al., 16 Organometallics, 4567-4571 (1997) (Year: 1997).*
A. Antiñolo et al., 694 Journal of Organometallic Chemistry, 1959-1970 (2009) (Year: 2009).*
H. Damrau et al., 20 Organometallics, 5258-5265 (2001) (Year: 2001).*
S. Fox et al., 357 Inorganica Chimica Acta, 225-234 (2004) (Year: 2004).*
M. Kessler et al., 19 Chemistry a European Journal, 6350-6357 (2013) (Year: 2013).*
Machat, M. R. et al. (2018) "Behind the Scenes of Group 4 Metallocene Catalysis: Examination of the Metal-Carbon Bond," *Organometallics*, v.37, pp. 2690-2705.

* cited by examiner

*Primary Examiner* — Alexander R Pagano

(57) ABSTRACT

A process to synthesize a Group 4 ansa-metallocene. The process includes reacting an alkaline earth metal dianion dicyclopentadiene ligand-Lewis base complex with a Group 4 metal tetrahalide in the presence of an alkali metal halide, and forming the Group 4 ansa-metallocene dihalide with high yield and purity.

20 Claims, 6 Drawing Sheets

METALLOCENE SYNTHESIS PROCESS

PRIORITY CLAIM

This application is a national stage filing of Patent Cooperation Treaty Application No. PCT/US2019/038169, which claims priority to and the benefit of U.S. Ser. No. 62/693,504, filed Jul. 3, 2018 and EP 18191970.5, filed Aug. 31, 2018, which are incorporated by reference herein.

FIELD OF THE INVENTION

The present disclosure relates to processes for synthesis of ansa-metallocenes.

BACKGROUND OF THE INVENTION

Group 4 ansa-metallocenes such as substituted hafnocenes used in olefin polymerization processes, are described in U.S. Pat. Nos. 6,242,545; 6,248,845; 6,528,597; 6,936,675; 6,956,088; 7,172,816; 7,179,876; 7,381,783; 8,247,065; 8,378,043; 8,476,392; 9,290,593; and U.S. Patent Application Publication No. 2015/0291748.

Ansa-metallocenes have typically been synthesized by formation of a neutral bridged ligand, deprotonation to form the ligand dianion, reaction with transition metal tetrahalide, and then alkylation. However, in some cases this procedure gives a product of 60 to 65% purity and usually contaminated with a mixture of organic species derived from the ligand dianion. In an example, with the ligand dimethylsilyl-bis((trimethylsilyl) methylcyclopentadiene) ("Lig$^1$"), synthesis of Lig$^1$-HfMe$_2$ may start with the reaction of LiCpCH$_2$SiMe$_3$ with Me$_2$SiCl$_2$ in THF, followed by deprotonation with n-BuLi, and isolation of the ligand dianion. See Scheme 1:

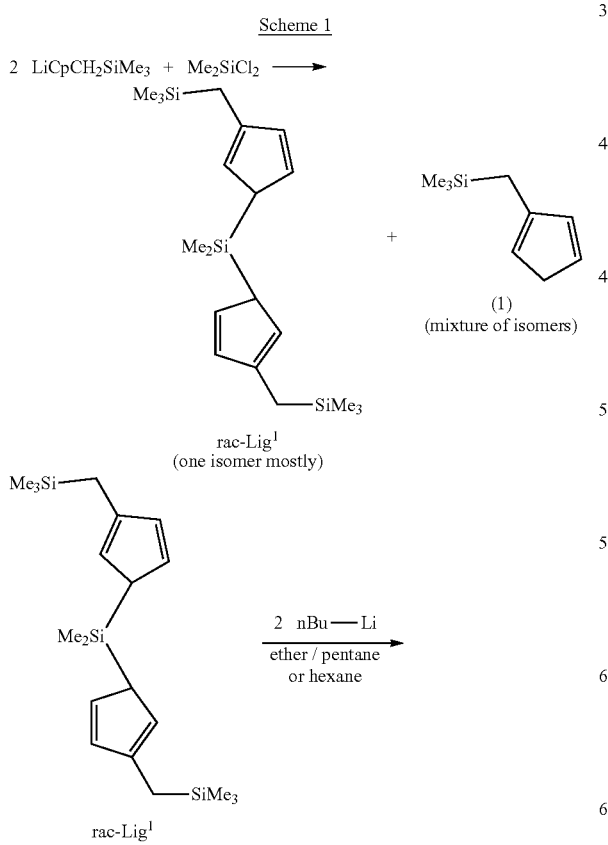

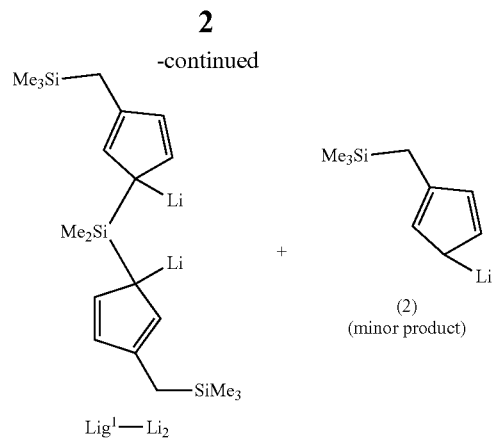

The dilithium salt of the ligand may contain greater than 7 mol % of the mono-Cp anion. The impurity might result from deprotonation of the neutral bridged species by reaction with the unreacted starting LiCpCH$_2$SiMe$_3$, present following the first step, to form the neutral H-CpCH$_2$SiMe$_3$, which is then deprotonated back to the LiCpCH$_2$SiMe$_3$ anion in the second step. Moreover, the reaction of the dilithium salt of the ligand with HfCl$_4$ is not clean and yields Me$_2$Si-bis(CpCH$_2$SiMe$_3$)HfCl$_2$ on the order of 60 to 65%. See Scheme 2:

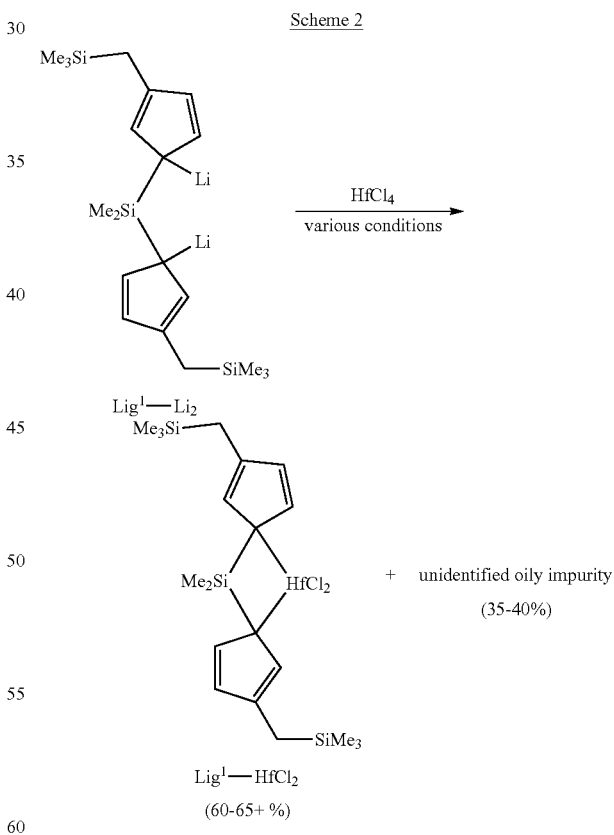

The use of different solvents, temperatures, and hafnium compounds, as well as starting with the purified dilithium salt of the ligand, have all obtained similarly poor results. Attempts to remove the impurities by recrystallization of the Lig$^1$-HfCl$_2$ compound tend to lose about half of the yield due to its high solubility in aliphatic hydrocarbons. In addition, the rac/meso ratio is sensitive to slight differences in the initial conditions of the recrystallization, and the rac/meso ratio is not usefully reproducible in this method. Moreover, a separate purification step is required to obtain the metallocene dihalide prior to alkylation to the corresponding catalyst compound, complicating the synthesis procedure, and requiring additional time and separate purification and alkylation vessels.

U.S. Pat. No. 5,831,106 similarly discloses that the Scheme 2 type of reaction forms undesirable compounds (such as LiCl) that can be difficult to remove, and discloses another synthesis route said to have improved yield and purity, namely, the reaction of a magnesocene such as dimethylsilanediyl-bis(2-methylbenzindenyl)-Mg*2THF with a bis-acetylacetonato Group 4 metal halide compound such as bis(acetylacetonato)ZrCl$_2$, as reported in U.S. Pat. No. 5,831,106. Reacting a diamine adduct of the desired metal halide with an alkali metal or a magnesium halide salt of a cyclopentadiene ligand was similarly disclosed in WO 1996/034002A1 and U.S. Pat. No. 5,760,262. However, these require the additional step of preparing the intermediate acetylacetonato complex such as by reacting ZrCl$_4$ with acetylacetonate, or preparing the diamine adduct by treatment with the diamine Applicant also found that the reaction of a magnesocene directly with a transition metal tetrahalide such as HfCl$_4$ did not provide a reaction product mixture having the improved yield and purity to the extent desired.

WO 1996/019488A1 discloses a method of preparing high purity racemic metallocene alkyls substantially free of alkali metal salts and meso isomer comprising forming a reaction product in the presence of a solvent of a cyclopentadienyl ligand Group 1 or Group 2 metal salt and a perhalogenated Group 4-6 transition metal compound or its etherate complex, combining the crude reaction product with an alkylating agent such as an alkali metal alkyl or Grignard reagent, separating the resulting solution, and then removing the solvent and washing to recover the metallocene alkyl. This document also discloses when the alkylating reagent used in the alkylating step is a Grignard reagent, the addition of 1,4-dioxane may facilitate precipitation of magnesium salts.

U.S. Pat. No. 5,359,105 discloses deprotonation of cyclopentadienyl derivatives by reaction with a Grignard reagent in an inert solvent which contains 0.5-1.5 equivalents per cyclopentadienyl equivalent of a cyclic ether or acyclic polyether so as to form the dianionic salt. Conducting the Grignard reaction in the absence of ether followed by ether addition resulted in gel formation, whereas excess ether produced the mono-MgCl salt and other impurities contaminating the product, reduction of yield, and slowing of the reaction rate.

Thus, there is a need for a metallocene synthesis process that improves purity and/or yield of the metallocene, facilitates purification of the metallocene, and/or facilitates control and/or reproducibility of the rac/meso isomer ratio, and/or that simplifies the synthesis process.

SUMMARY OF THE INVENTION

In a class of embodiments, the invention provides a process for synthesizing a Group 4 ansa-metallocene comprising (i) reacting a bridged dicyclopentadienyl dianion-alkaline earth metal-Lewis base complex with a Group 4 metal tetrahalide in the presence of an alkali metal halide; and (ii) forming the Group 4 ansa-metallocene dihalide. Preferably, the bridged dicyclopentadienyl dianion-alkaline earth metal-Lewis base complex is represented by formula (A), the Group 4 metal tetrahalide is represented by formula (B), and the alkali metal halide is represented by formula (C), wherein the alkaline earth metal dianion ligand complex comprises an alkaline earth metal metallocene, the corresponding diGrignard complex, or a combination thereof, wherein the formula (A) is:

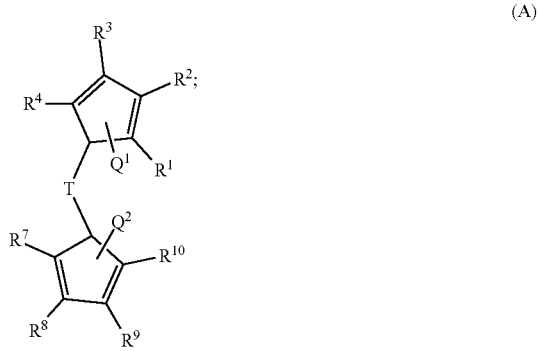

where each $R^1$ to $R^4$ and $R^7$ to $R^{10}$ is independently hydrogen, alkoxide, a $C_1$ to $C_{40}$ substituted or unsubstituted hydrocarbyl group, —CH$_2$—SiR'$_3$ or —CH$_2$—CR'$_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group; and together $Q^1$ and $Q^2$ are a divalent complex of an alkaline earth metal complexed with a Lewis base, preferably according to the formula (D1), or each $Q^1$ and $Q^2$ is independently an anion of a monovalent complex of an alkaline earth metal complexed with a Lewis base, preferably according to the formula (D2), wherein the formulae (D1) and (D2) are:

$$>M^1L^1L^2 \qquad (D1),$$

$$-M^1X^1L^1L^2 \qquad (D2);$$

where ">" indicates a divalent complex and "–" indicates a monovalent complex;

$M^1$ is an alkaline earth metal, such as a Group 2 metal, such as magnesium;

$X^1$ is a halogen such as chlorine; and together L1 and $L^2$ are a difunctional Lewis base, or each $L^1$ and $L^2$ is independently a monofunctional Lewis base;

wherein the formula (B) is:

$$M^2X^2_4 \qquad (B),$$

where $M^2$ is a Group 4 transition metal such as hafnium, zirconium, or titanium; and each $X^2$ is independently halogen; and wherein the formula (C) is:

$$M^3X^3 \qquad (C),$$

where $M^3$ is an alkali metal, such as a Group 1 metal, such as lithium and $X^3$ is independently halogen such as chlorine.

Preferably, the process comprises the reaction of the alkaline earth metal dianion ligand complex with the Group 4 metal tetrahalide in the presence of the alkali metal halide at a molar ratio of the alkali metal halide to the alkaline earth metal dianion ligand complex equal to or preferably greater than 1, more preferably wherein the molar ratio is greater than 1.5 or equal to or greater than 2. Where the alkaline earth metal dianion ligand complex comprises the diGrignard, the alkali metal is preferably combined with the diGrignard prior to the reaction with the Group 4 transition metal tetrahalide.

Preferably, the reaction produces a Group 4 ansa-metallocene dihalide represented by the formula (E):

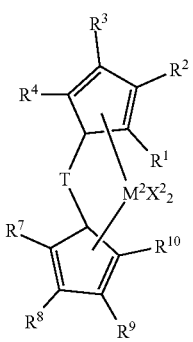

(E)

where $R^1$ to $R^4$, $R^7$ to $R^{10}$, T, $M^2$, and $X^2$ are as defined above.

The process may optionally further comprise alkylation of the Group 4 ansa-metallocene dihalide product with an alkylation reagent. Other embodiments of the invention are described and claimed herein and are apparent by the following disclosure.

DETAILED DESCRIPTION

Figure 1:
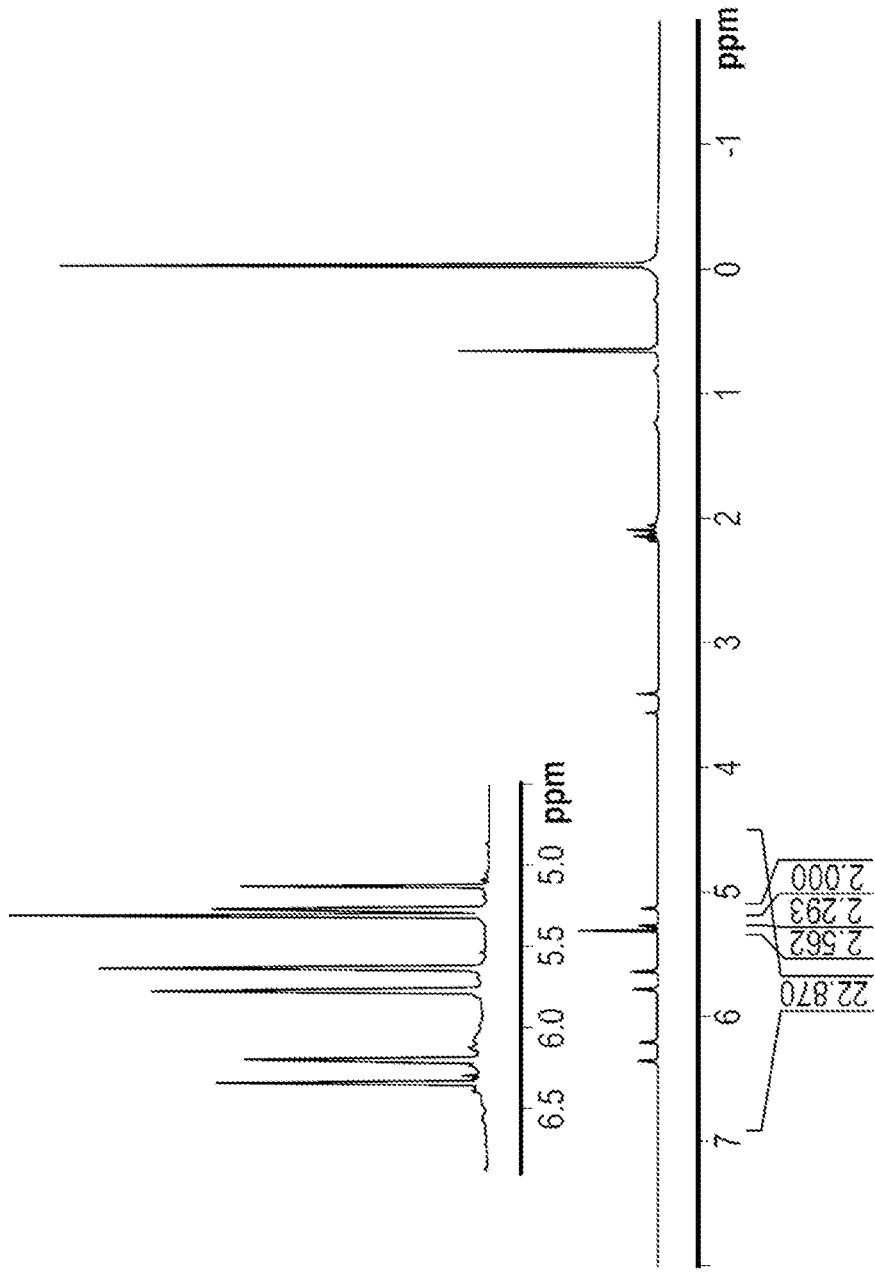
FIG. 1 is a $^1$H NMR analysis of the reaction mixture from the prior art synthesis of $HfCl_2$ from $Me_2Si((Me_3Si)CH_2Cp)_2Li_2$ and $HfCl_4$ as described in Run 5 of the examples below.

Before the present compounds, components, compositions, and/or methods are disclosed and described, it is to be understood that unless otherwise indicated this invention is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

In several classes of embodiments of the invention, the present disclosure is directed to the synthesis of Group 4 ansa-metallocene compounds.

For purposes of this invention and the claims hereto, the numbering scheme for the Periodic Table Groups is according to the new notation of the IUPAC Periodic Table of Elements. Alkaline earth metal means a Group 2 metal, such as berylium, magnesium, calcium, strontium, or barium. Alkali metal means a Group 1 metal, such as lithium, sodium, potassium, rubidium, and cesium.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

The terms "hydrocarbyl radical," "hydrocarbyl," and "hydrocarbyl group" are used interchangeably throughout this document. For purposes of this disclosure, "hydrocarbyl radical" is defined to be $C_1$-$C_{100}$ radicals, that may be linear, branched, or cyclic, and when cyclic, aromatic or nonaromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like where each $R*$ is independently a hydrocarbyl or halocarbyl radical, and two or more $R*$ may join together to form a substituted or unsubstituted completely saturated, partially unsaturated, or aromatic cyclic or polycyclic ring structure, or where at least one heteroatom has been inserted within a hydrocarbyl ring.

Except with respect to the term "substituted hydrocarbyl," the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR*_2$, —$OR*$, —$SeR*$, —$TeR*$, —$PR*_2$, —$AsR*_2$, —$SbR*_2$, —$SR*$, —$BR*_2$, —$SiR*_3$, —$GeR*_3$, —$SnR*_3$, —$PbR*_3$, and the like, where each $R*$ is independently a hydrocarbyl or halocarbyl radical, and two or more $R*$ may join together to form a substituted or unsubstituted completely saturated, partially unsaturated, or aromatic cyclic or polycyclic ring structure, or where at least one heteroatom has been inserted within a hydrocarbyl ring. As examples, methyl cyclopentadiene (Cp) is a Cp group substituted with a methyl group, and ethyl alcohol is an ethyl group substituted with an OH group.

As used herein, and unless otherwise specified, the term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$, —$(CH_3)CHCH_2CH_3$, —$CH_2CH(CH_3)_2$, etc.).

The following abbreviations may be used herein: Me is methyl, Et is ethyl, Pr is propyl, iPr is isopropyl, Bu is butyl, nBu is normal butyl, iBu is isobutyl, tBu is tert-butyl, Ph is phenyl, Np refers to neopentyl, dme, (also referred to as DME) is 1,2-dimethoxyethane, THF (also referred to as the is tetrahydrofuran, and RT is room temperature (and is 23° C. unless otherwise indicated).

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkoxy" refers to —O-alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated π system and having from 5 to 20 carbon atoms (aromatic $C_5$-$C_{20}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "hydroxyl" refers to an OH group.

As used herein, "oxygenate" refers to a saturated, unsaturated, or polycyclic cyclized hydrocarbon radical containing from 1 to 40 carbon atoms and further containing one or more oxygen heteroatoms.

As used herein, "Grignard reagent" is R-M-X where R is an organic radical, M is an alkaline earth metal, usually magnesium, and X is halogen.

As used herein, "ansa-metallocene" is a bridged dicyclopentadienyl metallocycle of the formula $T(Cp^1)(Cp^2)ML_n$ where T is a divalent bridging group, $Cp^1$ and $Cp^2$ are independently substituted or unsubstituted cyclopentadienyl groups, including indenyl and fluorenyl, for example, covalently bound to the bridging group T, M is a metal, L is an anion, and n is a number equal to the valence of M, typically 3 or 4.

As used herein, the term "bridged dicylopentadienyl" refers to a dicyclopentadienyl ligand in or capable of forming an ansa-metallocene, wherein the bridged dicyclopentadienyl ligand is according to the formula $T(Cp^1)(Cp^2)$, where T is a divalent bridging group, and $Cp^1$ and $Cp^2$ are substituted or unsubstituted cyclopentadienyl groups, including indenyl and fluorenyl, for example, and the ligand may be neutral or charged, e.g., the dianionic form of the deprotonated ligand.

[1] $^1$H NMR data herein were collected at room temperature using a Bruker spectrometer with a $^1$H frequency of either 400 MHz or 500 MHz.

In the specification and claims the "purity" of metallocenes is conventionally determined by quantitative NMR, i.e., by weighing out a specific amount of a sample and also weighing out a specific amount of another compound selected as an internal standard and comparing the signal ratios of the two compounds by $^1$H NMR. The NMR data may be obtained in deuterated benzene ($C_6D_6$) or deuterated tetrahydrofuran (d8-THF). The internal standard is selected as a compound of known purity that is non-reactive with the sample, soluble in a common deuterated solvent with the sample, and having at least one NMR signal completely separated from the sample signals. In the event of a conflict between the purity calculated from $^1$H NMR in $C_6D_6$ and d8-THF, the result from d8-THF shall control.

Synthesis of Group 4 Ansa-Metallocenes

In a class of embodiments, the present invention provides a method for synthesizing a Group 4 ansa-metallocene. The process comprises: (i) reacting a bridged dicyclopentadienyl dianion-alkaline earth metal-Lewis base complex with a Group 4 metal tetrahalide in the presence of an alkali metal halide; and (ii) forming the Group 4 ansa-metallocene dihalide; preferably according to Scheme 3:

Scheme 3 bridged dicyclopentadienyl dianion + Group 4 +
alkaline earth metal    metal halide
Lewis base complex
(i)

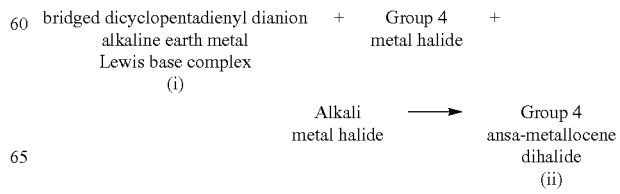

Preferably, the bridged dicyclopentadienyl dianion-alkaline earth metal-Lewis base complex is represented by the formula (A):

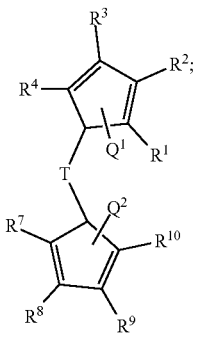

(A)

where each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$ join to form a substituted or unsubstituted, saturated, partially unsaturated or aromatic, cyclic or polycyclic substituent, —$CH_2$—$SiR'_3$, or —$CH_2$—$CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group; and together $Q^1$ and $Q^2$ are a divalent alkaline earth metal complexed with a Lewis base, preferably according to the formula (D1), or each $Q^1$ and $Q^2$ is independently an alkaline earth metal cation as would be formed by reacting a neutral bridged dicyclopentadienyl ligand with a Grignard reagent and complexing with a Lewis base, preferably according to the formula (D2), wherein the formulae (D1) and (D2) are:

$$>M^1L^1L^2 \qquad (D1);$$

$$-M^1X^1L^1L^2 \qquad (D2);$$

where $M^1$ is an alkaline earth metal, preferably magnesium; $X^1$ is halogen, preferably chlorine, bromine, or iodine; and together $L^1$ and $L^2$ are a difunctional Lewis base, or each $L^1$ and $L^2$ is independently a monofunctional Lewis base.

The Group 4 metal tetrahalide is preferably represented by the formula (B):

$$M^2X^2_4 \qquad (B),$$

where $M^2$ is a Group 4 transition metal, preferably hafnium or zirconium; and
each $X^2$ is independently halogen.

The alkali metal halide is preferably represented by the formula (C):

$$M^3X^3 \qquad (C),$$

where $M^3$ is an alkali metal such as lithium and $X^3$ is independently halogen, preferably chlorine.

Preferably, in the bridged dicyclopentadienyl dianion-alkaline earth metal-Lewis base complex in the formula (A):
each $R^1$ and $R^4$ is independently hydrogen, alkoxide or a $C_1$ to $C_{40}$ substituted or unsubstituted hydrocarbyl group;
each $R^2$, $R^3$, $R^8$, and $R^9$ is independently hydrogen, alkoxide or a $C_1$ to $C_{40}$ substituted or unsubstituted hydrocarbyl group or is —$CH_2$—$SiR'_3$ or —$CH_2$—$CR'_3$, and each R' is independently hydrogen or a $C_1$ to $C_{20}$ substituted or unsubstituted hydrocarbyl, provided that at least one R' is not H and at least one of $R^2$ and $R^3$ is —$CH_2$—$SiR'_3$ or —$CH_2$—$CR'_3$ (for example, if two of R' are hydrogen and the other R' is methyl, —$CH_2$—$CR'_3$ is propylene);
each $R^7$ and $R^{10}$ is independently hydrogen, alkoxide or a $C_1$ to $C_{40}$ substituted or unsubstituted hydrocarbyl group;
$R^9$ is preferably —$CH_2$—$SiR'_3$ or —$CH_2$—$CR'_3$, and each R' is independently hydrogen or a $C_1$ to $C_{20}$ substituted or unsubstituted hydrocarbyl, provided that at least one R is not H;
preferably $R^9$ and $R^3$ are, independently, —$CH_2$—$SiR'_3$ or —$CH_2$—$CR'_3$, and each R' is independently hydrogen or a $C_1$ to $C_{20}$ substituted or unsubstituted hydrocarbyl, provided that at least one R' is not H, more preferably each R is independently hydrogen or a $C_1$ to $C_{20}$ substituted or unsubstituted hydrocarbyl;
preferably $R^9$ and $R^3$ or $R^2$ are, independently, —$CH_2$—$CMe_3$, or —$CH_2$—$SiMe_3$; and
preferably T is a bridging group comprising a group 14 atom and one or more of a $C_1$-$C_{10}$ linear hydrocarbyl group or substituted or unsubstituted hydrocarbyl group, more preferably T is —Si(Me$_2$)-.

It has further been found that the purity of the reaction product from the reaction (i) of Scheme 3 is unexpectedly improved by conducting the reaction in the presence of an alkali metal halide such as LiCl. Surprisingly, the purity of the product in the crude reaction medium where LiCl is present is on the same order as the aliphatic extract where the reaction medium is aromatic and no LiCl is present. Preferably, an initial molar ratio of the alkali metal halide to the bridged dicyclopentadienyl dianion-alkaline earth metal-Lewis base complex in the reaction (i) of Scheme 3 is equal to or greater than 1, preferably greater than 1, greater than 1.5, or equal to or greater than 2. The lower amounts of the alkali metal halide provide less benefit, whereas higher amounts are not needed.

Preferably, the Group 4 ansa-metallocene dihalide from the formation (ii) in Scheme 3 has a purity equal to or greater than 70 weight percent, preferably equal to greater than 75 weight percent, more preferably equal to or greater than 80 weight percent or equal to or greater than 85 weight percent, wherein the purity is determined on a solvent-free basis by quantitative $^1$H NMR using an internal standard; or more preferably, the Group 4 ansa-metallocene dihalide from (ii) following solvent removal has a purity equal to or greater than 70 weight percent, preferably equal to greater than 75 weight percent, more preferably equal to or greater than 80 weight percent or equal to or greater than 85 weight percent, wherein the purity is determined on a total weight basis by quantitative $^1$H NMR using an internal standard.

In any embodiment, the process may further comprise derivatizing the Group 4 ansa-metallocene dihalide from formation (ii) of Scheme 3, e.g., alkylating the Group 4 ansa-metallocene dihalide, preferably to form the corresponding Group 4 ansa-metallocene dialkyl. The purity of the Group 4 ansa-metallocene dihalide in the reaction mixture from (i) may be such that, except for solvent removal if this is needed, no further purification is needed and the derivatization can be done using the reaction mixture directly. Preferably, the reaction in (i) and the alkylation are in the same reactor, more preferably without isolating the Group 4 ansa-metallocene between the reaction in (i) and the alkylation.

In any embodiment, the process may further comprise preparing the bridged dicyclopentadienyl dianion-alkaline earth metal-Lewis base complex for the reaction (i) of Scheme 3. Preferably, the process comprises: deprotonating a neutral bridged dicyclopentadienyl ligand with an alkaline earth metal compound to form the corresponding dianion, preferably wherein the neutral bridged dicyclopentadienyl ligand has the formula (F) or is an isomer of the formula (F):

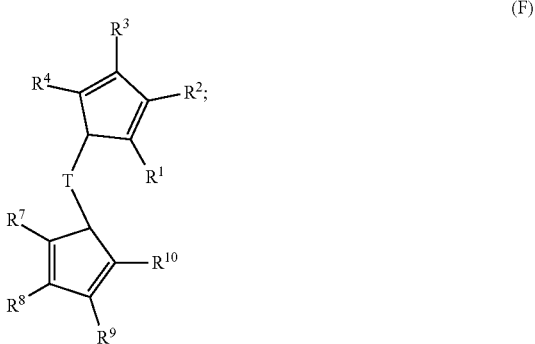

(F)

where each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$, join to form a substituted or unsubstituted, saturated, partially unsaturated or aromatic, cyclic or polycyclic substituent, —$CH_2$—$SiR'_3$, or —$CH_2$—$CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent, provided that at least one R is not H; and T is a bridging group, preferably comprising a group 14 atom and one or more of hydrogen, a $C_1$-$C_{10}$ hydrocarbyl group, or substituted hydrocarbyl group, more preferably T is —$Si(Me_2)$—; and complexing the dianion with a Lewis base, preferably a difunctional Lewis base, to form the bridged dicyclopentadienyl dianion-alkaline earth metal-Lewis base complex for the reaction (i) of Scheme 3.

Preferably, the alkaline earth metal compound in the deprotonation is an alkaline earth metal dialkyl, preferably Mg-$nBu_2$ or nBuEtMg or Mg-$iPr_2$, and the complexed dianion comprises alkaline earth metal metallocene, preferably according to formula (A1):

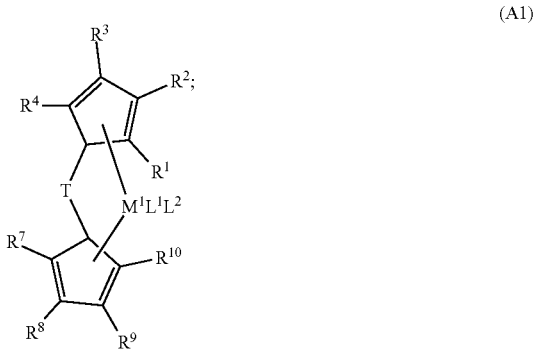

(A1)

where T, $R^1$ to $R^4$, and $R^7$ to $R^{10}$ are as defined above;
$M^1$ is an alkaline earth metal, preferably magnesium; and
together $L^1$ and $L^2$ are a difunctional Lewis base, preferably DME or 1,4-dioxolane, or each $L^1$ and $L^2$ is independently a monofunctional Lewis base, preferably THF.

The alkaline earth metal compound in the deprotonation is alternately a Grignard reagent, preferably iPr-Mg—Cl or nBu-Mg—Cl, and the dianion comprises the product from contacting the neutral bridged dicyclopentadienyl ligand with the Grignard reagent, preferably the diGrignard product is formed and may be used as the bridged dicyclopentadienyl dianion-alkaline earth metal-Lewis base complex for the reaction in (i) of Scheme 3.

If desired, the process may further comprise reacting a monocyclopentadiene anion with a bridging group compound to form the neutral bridged dicyclopentadienyl ligand. Preferably, the bridging group compound comprises $TX_2$ where T is a divalent bridging group and X is halogen.

In any embodiment, the ansa-metallocenes synthesized by the present process may be represented by the formula (E1):

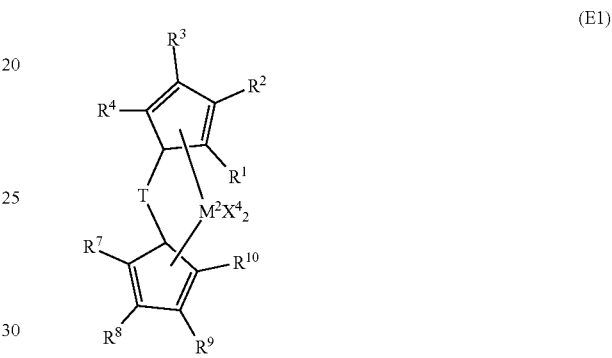

(E1)

where $M^2$ is Hf or Zr or Ti, preferably Hf or Zr;
each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$, join to form a substituted or unsubstituted, saturated, partially unsaturated or aromatic, cyclic or polycyclic substituent, —$CH_2$—$SiR'_3$ or —$CH_2$—$CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group, such as $CR^{21}R^{22}$ or $ZR^{21}R^{22}$ where Z is Si, Ge, or Sn, $R^{21}$ and $R^{22}$ are independently hydrogen, halogen, or a $C_1$-$C_{20}$ containing hydrocarbyl group (for example, linear hydrocarbyl group), substituted hydrocarbyl group, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and each $X^4$ is, independently, a univalent anionic ligand, or two $X^4$ are joined and bound to the metal atom to form a metallocycle ring, or two $X^4$ are joined to form a chelating ligand, a diene ligand, or an alkylidene ligand (preferably halogen or $C_1$ to $C_{12}$ alkyl or aryl, such as Cl, Me, Et, Ph).

In a preferred embodiment of the ansa-metallocenes of Formula (E1):
each $R^1$, $R^2$, $R^4$, $R^7$, $R^8$, and $R^{10}$ is independently hydrogen, or a $C_1$ to $C_{40}$ substituted or unsubstituted hydrocarbyl group, preferably each $R^1$, $R^2$, $R^4$, $R^7$, $R^8$, and $R^{10}$ is independently hydrogen or a $C_1$ to $C_{20}$ substituted or unsubstituted hydrocarbyl group; and
each $R^3$ and $R^9$ is independently a $C_1$ to $C_{40}$ substituted or unsubstituted hydrocarbyl group, or is —$R^{20}$—$SiR'_3$ or —$R^{20}$—$CR'_3$ where $R^{20}$ is a $C_1$ to $C_4$ hydrocarbyl, and each R' is independently hydrogen or a $C_1$ to $C_{20}$ substituted or unsubstituted hydrocarbyl; more preferably $R^3$ is a $C_1$ to $C_{20}$ substituted or unsubstituted hydrocarbyl group, preferably an alkyl group, or is —$R^{20}$—$SiR'_3$ or —$R^{20}$—$CR'_3$ where $R^{20}$ is a $C_1$ to $C_4$ hydrocarbyl, and each R' is independently a $C_1$ to $C_{20}$ substituted or unsubstituted hydrocarbyl.

In a preferred embodiment of the invention, $M^2$ is Hf, alternately $M^2$ is Zr.

In a preferred embodiment of the invention, each $R^1$, $R^2$, $R^4$, $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, each $R^3$ and $R^9$ is independently —$R^{20}$—$SiR'_3$ or —$R^{20}$—$CR'_3$ where $R^{20}$ is a $C_1$ to $C_4$ hydrocarbyl (preferably methylene, ethylene, propylene, butylene, or an isomer thereof), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Alternately, $R^9$ and optionally $R^3$ are, independently, —$R^{20}$—$CMe_3$, or —$R^{20}$—$SiMe_3$ where $R^{20}$ is a $C_1$ to $C_4$ hydrocarbyl (preferably methyl, ethyl, propyl, butyl), preferably —$CH_2$—$CMe_3$, or —$CH_2$—$SiMe_3$.

Alternately, each $X^4$ may be, independently, a halide, a hydride, an alkyl group, an alkenyl group or an arylalkyl group.

Alternately, each $X^4$ is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two $X^4$'s may form a part of a fused ring or a ring system), preferably each $X^4$ is independently selected from halides, aryls and $C_1$ to $C_5$ alkyl groups, preferably each $X^4$ is a phenyl, methyl, ethyl, propyl, butyl, pentyl, bromo, or chloro group.

Preferably, T is a bridging group containing at least one Group 13, 14, 15, or 16 element, in particular boron or a Group 14, 15 or 16 element. Examples of suitable bridging groups include P(=S)R', P(=Se)R', P(=O)R', $R'_2C$, $R'_2Si$, $R'_2Ge$, $R'_2CCR'_2$, $R'_2CCR'_2CR'_2$, $R'_2CCR'_2CR'_2CR'_2$, R'C=CR', R'C=CR'CR'_2, $R'_2CCR'$=CR'CR'_2, R'C=CR'CR'=CR', R'C=CR'CR'_2CR'_2, $R'_2CSiR'_2$, $R'_2SiSiR'_2$, $R'_2SiOSiR'_2$, $R'_2CSiR'_2CR'_2$, $R'_2SiCR_2SiR_2$, R'C=CR'SiR'_2, $R'_2CGeR'_2$, $R'_2GeGeR'_2$, and $R'_2CGeR'_2CR'_2$, where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, SiMePh, $Si(CH_2)_3$, $Si(CH_2)_4$, and $Me_2SiOSiMe_2$.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated or saturated cyclic or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, $Me_2SiOSiMe_2$, and cyclopentasilylene ($Si(CH_2)_4$).

In any embodiment of the invention, the molar ratio of rac to meso in the synthesized metallocene compound is from 1:100 to 100:1. Preferably, the rac:meso ratio is from 0.7 to 1.5, or from 0.75 to 1.4, or from 0.8 to 1.3, or from 0.9 to 1.1, or from 0.95 to 1.05, or about 1:1. In other embodiments, the rac:meso ratio is preferably 5:1 to 90:1, preferably 7:1 to 80:1, preferably 5:1 or greater, or 7:1 or greater, or 20:1 or greater, or 30:1 or greater, or 50:1 or greater. In an embodiment of the invention, the synthesized metallocene comprises an amount greater than or equal to 50 mol %, preferably greater than or equal to 60 mol % of the racemic isomer, or greater than or equal to 70 mol % of the racemic isomer, or greater than or equal to 80 mol % of the racemic isomer, or greater than or equal to 90 mol % of the racemic isomer, or greater than or equal to 92 mol % of the racemic isomer, or greater than or equal to 95 mol % of the racemic isomer, or greater than or equal to 97 mol % of the racemic isomer, based on the total amount of the racemic and meso isomer, if any, formed. In particular embodiments of the invention, the metallocene transition metal compound formed consists or consists essentially of equimolar amounts of the racemic and meso isomers, or consists or consists essentially of the racemic isomer. Amounts of rac and meso isomers are determined by proton NMR.

This invention further relates to:
1. A process for synthesizing a Group 4 ansa-metallocene comprising:
   (i) reacting a bridged dicyclopentadienyl dianion-alkaline earth metal-Lewis base complex with a Group 4 metal tetrahalide in the presence of an alkali metal halide; and
   (ii) forming the Group 4 ansa-metallocene dihalide.
2. The process of paragraph 1, wherein the bridged dicyclopentadienyl dianion-alkaline earth metal-Lewis base complex is represented by the formula (A):

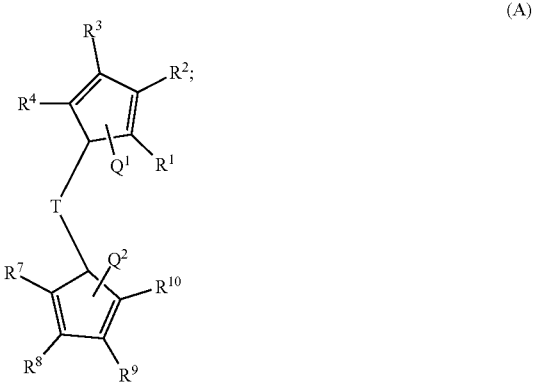

(A)

where each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$ join to form a substituted or unsubstituted, saturated, partially unsaturated or aromatic, cyclic or polycyclic substituent, —$CH_2$—$SiR'_3$ or —$CH_2$—$CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group; and together $Q^1$ and $Q^2$ are a divalent alkaline earth metal complexed with a Lewis base, preferably according to the formula (D1), or each $Q^1$ and $Q^2$ is independently an alkaline earth metal cation as would be formed by reacting a neutral bridged dicyclopentadienyl ligand with a Grignard reagent and complexing with a Lewis base, preferably according to the formula (D2), wherein the formulae (D1) and (D2) are:

$$>M^1L^1L^2 \quad (D1);$$

$$-M^1X^1L^1L^2 \quad (D2);$$

where ">" indicates a divalent complex and "–" indicates a monovalent complex;

M' is an alkaline earth metal, such as magnesium;

where M' is an alkaline earth metal, preferably magnesium;

$X^1$ is halogen, preferably chlorine; and together $L^1$ and $L^2$ are a difunctional Lewis base, or each $L^1$ and $L^2$ is independently a monofunctional Lewis base;

wherein the Group 4 metal tetrahalide is represented by the formula (B):

$$M^2X^2{}_4 \quad (B),$$

where $M^2$ is a Group 4 transition metal, preferably hafnium or zirconium; and each $X^2$ is independently halogen; and wherein the alkali metal halide is represented by the formula (C):

$$M^3X^3 \quad (C),$$

where $M^3$ is an alkali metal, preferably lithium, and $X^3$ is independently halogen, preferably chlorine.

3. The process of paragraph 2, wherein:

each $R^1$ and $R^4$ is independently hydrogen, alkoxide or a $C_1$ to $C_{40}$ substituted or unsubstituted hydrocarbyl group;

each $R^2$, $R^3$, $R^8$, and $R^9$ is independently hydrogen, alkoxide or a $C_1$ to $C_{40}$ substituted or unsubstituted hydrocarbyl group or is —CH$_2$—SiR'$_3$ or —CH$_2$—CR'$_3$, and each R' is independently hydrogen or a $C_1$ to $C_{20}$ substituted or unsubstituted hydrocarbyl, provided that at least one R' is not H and at least one of $R^2$ and $R^3$ is —CH$_2$—SiR'$_3$ or —CH$_2$—CR'$_3$;

each $R^7$ and $R^{10}$ is independently hydrogen, alkoxide or a $C_1$ to $C_{40}$ substituted or unsubstituted hydrocarbyl group;

$R^9$ is preferably —CH$_2$—SiR'$_3$ or —CH$_2$—CR'$_3$, and each R' is independently hydrogen or a $C_1$ to $C_{20}$ substituted or unsubstituted hydrocarbyl, provided that at least one R' is not H;

preferably $R^9$ and $R^3$ are, independently, —CH$_2$—SiR'$_3$ or —CH$_2$—CR'$_3$, and each R' is independently hydrogen or a $C_1$ to $C_{20}$ substituted or unsubstituted hydrocarbyl, provided that at least one R' is not H, more preferably each R' is independently a $C_1$ to $C_{20}$ substituted or unsubstituted hydrocarbyl;

preferably $R^9$ and $R^3$ or $R^2$ are, independently, —CH$_2$—CMe$_3$, or —CH$_2$—SiMe$_3$; and preferably T is a bridging group comprising a group 14 atom and one or more of hydrogen, a $C_1$-$C_{10}$ linear hydrocarbyl group, or substituted hydrocarbyl group, more preferably T is —Si(Me$_2$)—.

4. The process of paragraph 1, 2, or 3, wherein the reaction in (i) is in a fluid medium comprising a Lewis base, preferably an ether, preferably tetrahydrofuran.

5. The process of any of paragraphs 1 to 4 wherein an initial molar ratio of the alkali metal halide to the bridged dicyclopentadienyl dianion-alkaline earth metal-Lewis base complex in the reaction in (i) is equal to or greater than 1, preferably greater than 1, greater than 1.5, or equal to or greater than 2.

6. The process of any of paragraphs 1 to 5 wherein the Group 4 ansa-metallocene dihalide from (ii) has a purity equal to or greater than 70 weight percent, preferably equal to greater than 75 weight percent, more preferably equal to or greater than 80 weight percent or equal to or greater than 85 weight percent, wherein the purity is determined on a solvent-free basis by quantitative $^1$H NMR using an internal standard; or preferably wherein the Group 4 ansa-metallocene dihalide from (ii) following solvent removal has a purity equal to or greater than 70 weight percent, preferably equal to greater than 75 weight percent, more preferably equal to or greater than 80 weight percent or equal to or greater than 85 weight percent, wherein the purity is determined on a total weight basis by quantitative $^1$H NMR in using an internal standard.

7. The process of any of paragraphs 1 to 6, further comprising alkylating the Group 4 ansa-metallocene dihalide from (ii).

8. The process of paragraph 7, wherein the reaction in (i) and the alkylation are in the same reactor, preferably without isolating the Group 4 ansa-metallocene between the reaction in (i) and the alkylation.

9. The process of any of paragraphs 1 to 8 further comprising:

deprotonating a neutral bridged dicyclopentadienyl ligand with an alkaline earth metal compound to form the corresponding dianion, preferably wherein the neutral bridged dicyclopentadienyl ligand has the formula (F) or is an isomer of the formula (F):

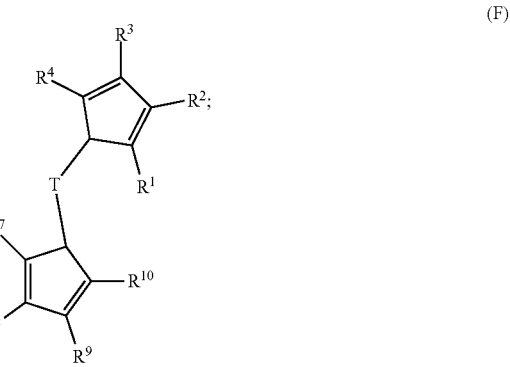

where each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$, join to form a substituted or unsubstituted, saturated, partially unsaturated or aromatic, cyclic or polycyclic substituent, —CH$_2$—SiR'$_3$ or —CH$_2$—CR'$_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent; and T is a bridging group, preferably comprising a group 14 atom and one or more of hydrogen, a $C_1$-$C_{10}$ hydrocarbyl group, or substituted hydrocarbyl group, more preferably T is —Si(Me$_2$)-; and complexing the dianion with a Lewis base, preferably a difunctional Lewis base, to form the bridged dicyclopentadienyl dianion-alkaline earth metal-Lewis base complex for the reaction (i).

10. The process of paragraph 9, wherein the alkaline earth metal compound in the deprotonation is an alkaline earth metal dialkyl, preferably Mg-nBu$_2$ or n-BuEtMg pr Mg-iPr$_2$, and the complexed dianion comprises alkaline earth metal metallocene, preferably according to formula (A1):

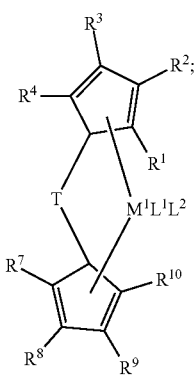

(A1)

where T, $R^1$ to $R^4$, and $R^7$ to $R^{10}$ are as defined above; M1 is an alkaline earth metal, preferably magnesium; and together $L^1$ and $L^2$ are a difunctional Lewis base, preferably DME or 1,4-dioxolane, or each $L^1$ and $L^2$ is independently a monofunctional Lewis base, preferably THF.

11. The process of paragraph 9, wherein the alkaline earth metal compound in the deprotonation is a Grignard reagent, preferably iPr-Mg-chloride or nBu-Mg-chloride, and the dianion comprises a diGrignard product.

12. The process of any of paragraphs 9 to 11, further comprising reacting a monocyclopentadiene anion with a bridging group compound to form the neutral bridged dicyclopentadienyl ligand, preferably where the bridging group compound comprises $T^1X_2$ where $T^1$ is a divalent bridging moiety and X is halogen.

13. The process of any of paragraphs 1 to 12, wherein the synthesized Group 4 ansa-metallocene is according to the formula (E1):

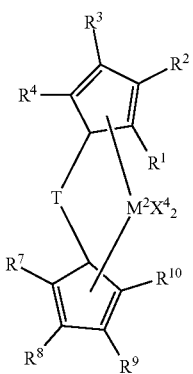

(E1)

where $M^2$ is a Group 4 transition metal, preferably hafnium or zirconium;

each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$, join to form a substituted or unsubstituted, saturated, partially unsaturated or aromatic, cyclic or polycyclic substituent, —CH$_2$—SiR'$_3$ or —CH$_2$—CR'$_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group, preferably CR$^{21}$R$^{22}$ or ZR$^{21}$R$^{22}$ where Z is Si, Ge, or Sn, $R^{21}$ and $R^{22}$ are independently hydrogen, halogen, or a $C_1$-$C_{20}$ containing hydrocarbyl group, preferably a linear hydrocarbyl group, substituted hydrocarbyl group, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and each $X^4$ is independently a univalent anionic ligand, or two $X^4$ are joined and bound to the metal atom to form a metallocycle ring, or two $X^4$ are joined to form a chelating ligand, a diene ligand, or an alkylidene ligand, preferably each $X^4$ is halogen or $C_1$ to $C_{12}$ alkyl or aryl, more preferably each $X^4$ is Cl, methyl, ethyl, or phenyl.

14. A process for synthesizing a Group 4 ansa-metallocene comprising:

(a) deprotonating a neutral bridged dicyclopentadienyl ligand with an alkaline earth metal compound selected from alkaline earth metal dialkyls and Grignard reagents to form the corresponding dianion comprising the alkaline earth metal, wherein the neutral bridged dicyclopentadienyl ligand is according to formula (F) or is an isomer of the formula (F):

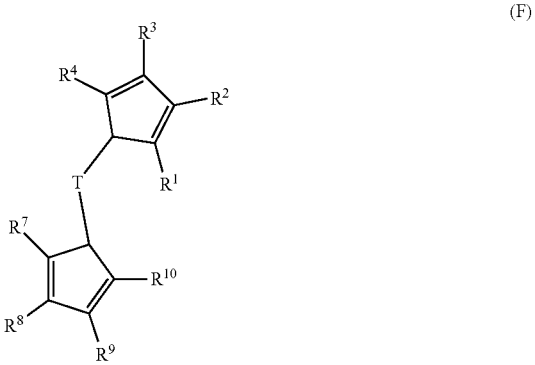

(F)

where each $R^1$ to $R^4$ and $R^7$ to $R^{10}$ is independently hydrogen, alkoxide, a $C_1$ to $C_{40}$ substituted or unsubstituted hydrocarbyl group, optionally where any two or more of $R^1$ to $R^4$ or two or more of $R^7$ to $R^{10}$, join to form a substituted or unsubstituted, saturated, partially unsaturated or aromatic, cyclic or polycyclic substituent, —CH$_2$—SiR'$_3$ or —CH$_2$—CR'$_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent, provided that at least one R is not H; and T is a bridging group, preferably comprising a group 14 atom and one or more of hydrogen, a $C_1$-$C_{10}$ hydrocarbyl group, or substituted hydrocarbyl group, more preferably T is —Si(Me$_2$)—;

(b) complexing the dianion from (a) with a Lewis base, preferably a difunctional Lewis base, to form a bridged dicyclopentadienyl dianion-alkaline earth metal-Lewis base complex;

(c) reacting the bridged dicyclopentadienyl dianion-alkaline earth metal-Lewis base complex from (b) with a Group 4 metal tetrahalide, preferably hafnium tetrachloride or zirconium tetrachloride, in a fluid medium comprising an alkali metal halide, preferably LiCl, and a solvent, preferably THF;

(d) forming Group 4 ansa-metallocene according to the formula (E):

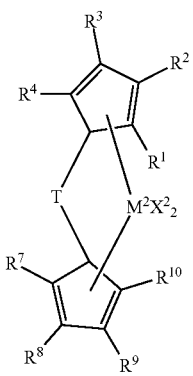

(E)

where T, $R^1$ to $R^4$, and $R^7$ to $R^{10}$ are as defined above;
$M^2$ is the Group 4 metal;
each $X^2$ is independently halogen; and (e) optionally alkylating the Group 4 ansa-metallocene from (d) with an alkylating agent to form the Group 4 ansa-metallocene according to the formula (E1):

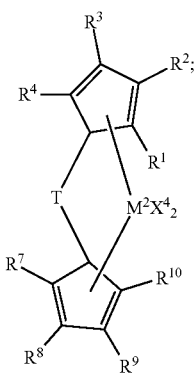

(E1)

where T, $R^1$ to $R^4$, $R^7$ to $R^{10}$, and $M^2$ are as defined above; and each $X^4$ is independently a univalent anionic ligand, preferably alkyl, preferably methyl, or two $X^4$ are joined and bound to the metal atom to form a metallocycle ring, or two $X^4$ are joined to form a chelating ligand, a diene ligand, or an alkylidene ligand.

15. The process of paragraph 14, wherein the reaction in (c) and the alkylation in (e) are in the same reactor, preferably without isolating the Group 4 ansa-metallocene between (c) and (e).

16. The process of paragraph 14 or paragraph 15, further comprising solvent extraction of the Group 4 ansa-metallocene formed in (d).

17. The process of any of paragraphs 14 to 16, wherein an initial molar ratio of the alkali metal halide to the bridged dicyclopentadienyl dianion-alkaline earth metal-Lewis base complex in the reaction in (c) is equal to or greater than 1, preferably greater than 1 or equal to or greater than 2.

18. The process of any of paragraphs 14 to 17, wherein the alkaline earth metal compound in the deprotonation in (a) is an alkaline earth metal dialkyl, preferably Mg-nBu$_2$ n-BuEtMg or Mg-iPr$_2$, and the dianion comprises alkaline earth metal metallocene.

19. The process of any of paragraphs 14 to 18, wherein the alkaline earth metal compound in the deprotonation in (a) is a Grignard reagent, preferably iPr-Mg-chloride or nBu-Mg-chloride, and the dianion comprises a diGrignard product.

20. The process of any of paragraphs 14 to 19 comprising the alkylation of (e) and wherein in the formula (E1):

each $R^1$, $R^2$, $R^4$, $R^7$, $R^8$, and $R^{10}$ is independently hydrogen, or a $C_1$ to $C_{40}$ substituted or unsubstituted hydrocarbyl group, preferably each $R^1$, $R^2$, $R^4$, $R^7$, $R^8$, and $R^{10}$ is independently hydrogen or a $C_1$ to $C_{20}$ substituted or unsubstituted hydrocarbyl group; and each $R^3$ and $R^9$ is independently a $C_1$ to $C_{40}$ substituted or unsubstituted hydrocarbyl group, or is —$R^{20}$—SiR'$_3$ or —$R^{20}$—CR'$_3$ where $R^{29}$ is a $C_1$ to $C_4$ hydrocarbyl, and each R' is independently hydrogen or a $C_1$ to $C_{20}$ substituted or unsubstituted hydrocarbyl; more preferably $R^3$ is a $C_1$ to $C_{20}$ substituted or unsubstituted hydrocarbyl group, preferably an alkyl group, or is —$R^{20}$—SiR'$_3$ or —$R^{20}$—CR'$_3$ where $R^{20}$ is a $C_1$ to $C_4$ hydrocarbyl, and each R' is independently a $C_1$ to $C_{20}$ substituted or unsubstituted hydrocarbyl.

21. The process of paragraph 20, wherein:
$M^2$ is Hf, or $M^2$ is Zr;
each $R^1$, $R^2$, $R^4$, $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof; and each $R^3$ and $R^9$ is independently —$R^{20}$—SiR'$_3$ or —$R^{20}$—CR'$_3$ where $R^{29}$ is a $C_1$ to $C_4$ hydrocarbyl, preferably methylene, ethylene, propylene, butylene, or an isomer thereof, and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Experimental

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

In the following examples, the bridged dicyclopentadiene ligand Me$_2$Si((Me$_3$Si)CH$_2$Cp)$_2$ is referred to as "Lig$^1$." The bridged hafnocene (rac/meso-Lig$^1$HfMe$_2$) shown below and the corresponding zirconocene (Lig$^1$ZrMe$_2$) were prepared.

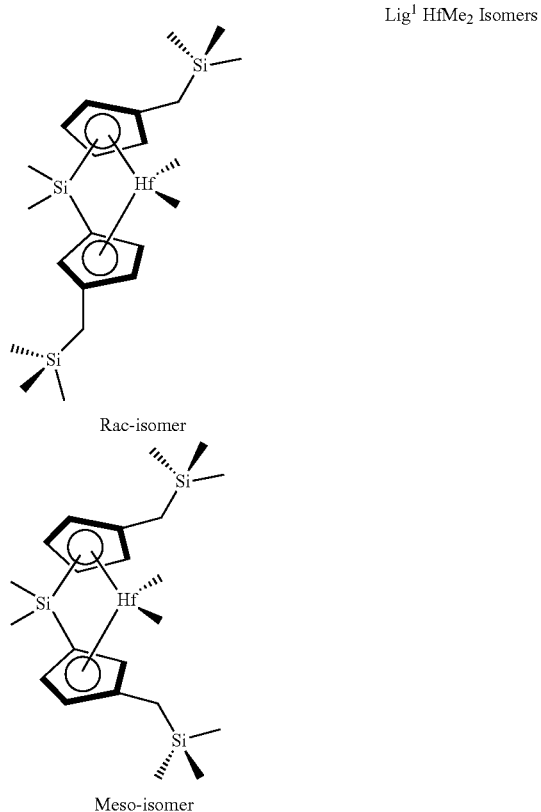

Lig$^1$ HfMe$_2$ Isomers

Rac-isomer

Meso-isomer

In the following examples, we refer to a "purity factor" or PF that is defined as the ratio of the integration of certain of the metallocene product resonances relative to the integration of a defined area of the $^1$H NMR spectrum. This is done to simplify the determination of the relative effectiveness of various preparation procedures. The PF method herein ignores the presence of most solvents or other impurities that do not result as byproducts from the complexation reaction, but provides a relative indication of the effectiveness of the synthesis method against which other synthesis procedures may be compared.

The purity factor procedure uses as the internal standard the weighted areas of two resonances from the ligand corresponding to the peaks reflecting the least contamination from impurities, relative to the total areas of the peaks over the relevant resonance range, which for Me$_2$Si((Me$_3$Si)CH$_2$Cp)$_2$ are according to the following Equation (1):

$$PF = 100*3*(A_1+A_2)/A_T \quad (1)$$

where PF is the purity factor, $A_1$ and $A_2$ are the integrated areas of the $^1$H NMR peaks at 4.95-5.05 ppm and 5.1-5.2 ppm, respectively, and $A_T$ is the total integrated area of the $^1$H NMR peaks at 4.5-6.9 ppm. FIG. 1 shows an example calculation for a typical Me$_2$Si((Me$_3$Si)CH$_2$Cp)$_2$ spectrum. In this example, the 4.95-5.05 ppm peak has an $A_1$ of 2.000, the 5.1-5.2 ppm peak has $A_2$ of 2.152, and the total $A_T$ is 20.288. Plugging these values into Equation 1 gives the following for this example:

$$PF = 300*(2.152+2.000)/20.288 = 61.$$

The NMR data may be obtained in deuterated benzene (C$_6$D$_6$) or deuterated tetrahydrofuran (d8-THF).

All manipulations were performed in an inert N$_2$ purged glove box unless otherwise stated. All anhydrous solvents were purchased from Sigma Aldrich and were degassed and dried over molecular sieves prior to use. Deuterated solvents were purchased from Cambridge Isotope Laboratories and were degassed and dried over molecular sieves prior to use. n-Butyl lithium (solution in hexane), dimethylsilyl dichloride (Me$_2$SiCl$_2$), and methylmagnesium bromide (3.0 M solution in diethyl ether) were purchased from Sigma-Aldrich. Hafnium tetrachloride (HfCl$_4$) 99+% and (trimethylsilyl)methyl trifluoromethanesulfonate were procured from Strem Chemicals and TCI America, respectively. All chemicals were used as purchased unless otherwise stated.

Run 1: Synthesis of (Trimethylsilyl) methylcyclopentadiene, (Me$_3$Si)CH$_2$CpH. (Trimethylsilyl)methyl trifluoromethanesulfonate (10.57g, 44.7 mmol) was dissolved in 150 mL of diethyl ether and cooled to −25° C., to this a solid potassium cyclopentadienide (KCp) (4.66 g, 44.7 mmol) was slowly added over a period of 5-10 minutes. It was prepared in accordance with the description in Amsharov, K.; Abdurakhmanova, N.; Stepanow, S.; Rauschenbach, S.; Jansen, M.; Kern, K. Angew. Chem. Int. Ed. 2010, 49, 9392-9396. The resulting mixture was stirred 5 hours at about 23° C. Volatiles from the reaction mixture were carefully removed under dynamic vacuum to avoid evaporating the volatile (trimethylsilyl)methylcyclopentadiene, (Me$_3$Si)CH$_2$CpH. The reaction flask (250 mL round bottom flask) and frit with celite were weighted to calculate yield of the product after extraction. The crude materials were extracted into pentane (3×10 mL) and used without any further purification. Based on above mathematical method, the yield is calculated as 5.55 g (81.6%).

Run 2: Synthesis of Lithium (trimethylsilyl) methylcyclopentadienide, (Me$_3$Si)CH$_2$CpLi. A hexane solution of n-butyl lithium (14.6 mL, 36.5 mmol) was added drop-wise to a precooled solution (pentane and diethyl ether, 50/50 mL) of (Me$_3$Si)CH$_2$CpH (5.55 g, 36.5 mmol) over a period of 15-20 minutes at −25° C. The resulting mixture was gradually brought to about 23° C. and then continuously stirred overnight. Volatiles were removed in vacuo and remaining crude materials were thoroughly washed with pentane. The final materials were dried under vacuum to obtain a colorless crystalline solid of (Me$_3$Si)CH$_2$CpLi in 5.75 g (99.7%) yield.

Run 3: Synthesis of Lig$^1$H$_2$. Neat Me$_2$SiCl$_2$ (340 mg, 2.6 mmol) was dissolved in 10 mL of THF and cooled to −25° C. Solid lithium (trimethylsilyl) methylcyclopendienide was added and the resulting mixture was stirred overnight at about 23° C. Volatiles from the reaction mixture were removed in vacuo and the mixture subsequently triturated with pentane to remove traces of THF. The crude materials were extracted into pentane and followed by solvent removal under vacuum to obtain a thick yellow viscous oil of Me$_2$Si((Me$_3$Si)CH$_2$CpH)$_2$ (750 mg; 80% yield).

Run 4: Synthesis of Lig$^1$Li$_2$(DME): A hexane solution of n-butyl lithium (1.7 mL, 4.2 mmol, 2.5 M solution) was added drop-wise to a precooled solution of Me$_2$Si((Me$_3$Si)CH$_2$CpH)$_2$ (750 mg, 2.1 mmol) in 10 mL of dimethoxyethane over a period of 5-10 minutes at −25° C. The resulting mixture was gradually warmed to about 23° C. and then continuously stirred overnight. Volatiles from the reaction mixture were removed in vacuo, and triturated with pentane to remove DME. The crude materials were thoroughly washed with pentane to remove any soluble impurities, and dried under vacuum to give the colorless crystalline solid of Lig$^1$Li$_2$(DME) (830 mg; 93% yield).

TABLE A

Synthesis of Lig$^1$ from the Lig$^1$Li$_2$ and HfCl$_4$

| Run | Reaction solvent | Reaction Condition | Reaction Time | Purity Factor |
|---|---|---|---|---|
| 5 | Et$_2$O | HfCl$_4$(s) added to solution of Lig$^1$Li$_2$(DME) in ether at −25° C. | overnight | 63 |
| 6 | Et$_2$O | solid HfCl$_4$(s) added to slurry of Lig$^1$Li$_2$ in ether | 75 min | 64 |
| 7 | DME | solution of Lig$^1$Li$_2$ added to solution of HfCl$_4$ in DME | 2.5 | 62 |
| 8 | Et$_2$O | solid HfCl$_4$ added to slurry of Lig$^1$Li$_2$ in ether | overnight | 59 |
| 9 | Et$_2$O | solid HfCl$_4$ added to slurry of Lig$^1$Li$_2$ in ether at −25° C. | 16 h | 68 |
| 10 | Et$_2$O | solid HfCl$_4$ added to slurry of Lig$^1$Li$_2$ in ether at −25° C. | 16 h | 68 |
| 11 | Et$_2$O | solid HfCl4 added to solution of Lig$^1$Li$_2$ in ether at −25° C. | overnight | 65 |
| 12 | Et$_2$O | solid HfCl$_4$ added to solution of Lig$^1$Li$_2$ in ether at −25° C. | overnight | 55 |
| 13 | Et$_2$O | solid HfCl$_4$ added to solution of Lig$^1$Li$_2$ in ether at −25° C. | overnight | 54 |
| 14 | Et$_2$O | solid HfCl$_4$ added to solution of Lig$^1$Li$_2$ in ether at −25° C. | overnight | 65 |

Run 5: Synthesis of Lig$^1$HfCl$_2$ from Lig$^1$Li$_2$. Solid HfCl$_4$ (570 mg, 1.8 mmol) was added to a precooled diethyl ether (20 mL) solution of Me$_2$Si((Me$_3$Si)CH$_2$Cp)$_2$Li$_2$(DME) (830 mg, 1.8 mmol) at −25° C. The resulting mixture was stirred overnight at about 23° C. The $^1$H NMR of the reaction product mixture is shown in FIG. 1. Volatiles from the reaction mixture were removed in vacuo, and then extracted into dichloromethane. Solvent removal under vacuum gave a yellow crystalline solid of Lig$^1$HfCl$_2$ (1.02 g; 94% yield). The $^1$H NMR spectrum of final material indicated a 1:1 ratio of rac/meso isomers.

Runs 6-14: Synthesis of Lig$^1$HfCl$_2$ from Lig$^1$Li$_2$ at various reaction conditions. The procedure of Run 5 was repeated using a variety of solvents and other conditions as shown in Table A. All procedures of Runs 6-14 were similarly found to produce impurities in the reaction with similar purity factors found in Run 5. In most cases, these impurities were soluble in the aliphatic hydrocarbon used to do the extraction and thus contaminated the final product, Lig$^1$HfCl$_2$. These had purity factors in the range of 54-68, average about 62.

Run 15: Synthesis of Lig$^1$-Mg(DME). LiCpCH$_2$SiMe$_3$ (24.5 g; 155 mmol) was dissolved in THF (60 mL), Me$_2$SiCl$_2$ (10.1 g; 78.3 mmol) added in portions over ~1 minute, the reaction stirred 30 minutes at room temperature, and the THF was removed under vacuum at 35° C. to give a viscous slurry. The slurry was extracted with heptane (40 mL), the liquid isolated by filtration, and the solid residue washed with additional heptane (20 mL). The combined extracts were placed in a 250 mL rb flask and Bu2Mg (1.0M in heptanes; 75 mL; 75 mmol) was added in 10 mL portions with stirring over several minutes. The reaction was heated to 60° C. for 30 minutes; then heated to 93° C. for 3 hours. The solution was partially cooled and 40 mL of DME was added. The reaction was cooled to just below room temperature by addition of ~20 mL pentane and evaporating it off, which caused rapid precipitation of a colorless solid. The solid was isolated by filtration and the cake washed 2×30 mL with pentane. The solid was then collected, stirred for 5 minutes in 100 mL pentane, isolated by filtration, and dried under vacuum at 45° C. Yield=23.0 g; 63%; very clean by $^1$H NMR with a trace of pentane left.

Run 16: Synthesis of Lig$^1$-Mg(DME). LiCpCH$_2$SiMe$_3$ (23.28 g; 147.1 mmol) was dissolved in THF (~60 mL) and with stirring, Me$_2$SiCl$_2$ (9.54 g; 73.9 mmol) added in one portion. A precipitate formed immediately and the reaction was hot but did not reflux. After stirring 20 minutes the THF was removed under vacuum and the resulting oily mixture was extracted with heptane (~40 mL), filtered and the colorless solid on the frit was washed with 20 mL heptane. The solutions were filtered directly into a solution of Mg-nBu$_2$ in a flask with a stirbar, (1.0 M/heptane; 70.0 mL; 70.0 mmol). The reaction mixture was heated to 90° C. overnight (14 h). There was some oily material stuck to the bottom of the flask and floating in the solution. After cooling somewhat, 40 mL DME was added, a precipitate formed, and the slurry stirred for 45 minutes. No oily material was present. The solid was filtered and washed 2×50 mL with pentane, and dried under vacuum. Yield=22.0 g.

Run 17: Synthesis of Lig$^1$-Mg(DME). LiCpCH$_2$SiMe$_3$ (31.58 g; 199.6 mmol) was dissolved in THF (~70 mL) and Me$_2$SiCl$_2$ (12.87 g; 99.7 mmol) added with stirring over about a minute. A precipitate formed immediately and the reaction was hot but did not reflux. After stirring 20 minutes the THF was removed under vacuum at 42° C., the resulting oily mixture extracted with heptane (~50 mL), filtered, and washed with 25 mL heptane, leaving a colorless solid on the frit. To the combined stirring solutions was added Mg-nBu$_2$ (1.0 M/heptane; 95.0 mL; 95 mmol). The reaction mixture was heated to 90° C. for three hours then DME (~30 mL) was added and an emulsion formed. With further cooling a very light pink solid precipitated. The solid was washed with 2×40 mL pentane and dried under vacuum at 50° C. The solid was gummy, yield=38 g. The $^1$H NMR in d8-THF showed unreacted Mg-nBu$_2$ and other impurity. The solid was slurried in pentane (100 mL) and DME (50 mL) added with vigorous stirring. The almost colorless solid was isolated by filtration; washed with pentane (~50 mL) and dried under vacuum at 50° C. Yield=28.2 g; 1 $^1$H NMR in d8-THF. A portion (27.4 g) was slurried in DME (50 mL), heated to 80° C. with vigorous stirring. After slight cooling pentane (75 mL) was added and some pentane boiled off. The slurry was cooled to −20° C. for 90 minutes, the colorless precipitate isolated by filtration, washed with pentane (~40 mL), and dried under vacuum. Yield=24.2 g; very clean by $^1$H NMR.

Run 18: Reaction of Lig$^1$-Mg(DME) with HfCl$_4$ in toluene. Solid Lig$^1$-Mg(DME) (0.542 g; 1.15 mmol) was dumped into a rapidly stirring slurry of HfCl$_4$ (0.372 g; 1.16 mmol) in toluene (~20 mL). After stirring 2 hours at room temperature the solvent was pumped off and the residue extracted with warm pentane (~20 mL) leaving a colorless solid. An aliquot of the pentane solution was dried down and redissolved in C$_6$D$_6$ (17-AC$_{2531}$-B). This turned out to be fairly clean product of the rac/meso Lig$^1$HfCl$_2$. The bulk solution was dried down and gave a crystalline solid. Yield=0.35 g; the isolated colorless solid was washed with pentane 20 mL then dried under vacuum. Yield of this was 0.31 g; this was attempted to dissolve in C$_6$D$_6$ with brief warming to 65° C. but not much went in: the $^1$H NMR showed very little but low concentration of product and impurity and solvent. The initial $^1$H NMR showed that only about 60% of the Lig$^1$HfCl$_2$ was made and that about 40% was impurity.

Run 19: Reaction of Lig$^1$-Mg(DME) with HfCl$_4$ in toluene. Lig$^1$-Mg(DME) (0.890 g; 1.88 mmol) was slurried in toluene (~25 mL) and 0.34 mL of 1,4-dioxane (3.98 mmol)

was added. With stirring, solid HfCl$_4$ (0.60 g; 1.88 mmol) was added. There appeared to be a fairly rapid reaction. After stirring 80 minutes an aliquot was removed, dried down and the NMR taken in C$_6$D$_6$. The NMR was very similar to the previous prep in Run 18 except slightly cleaner; purity factor=67. The reaction was dried down, extracted with pentane (~25 mL), and filtered to give a yellow solution. This was dried down to give a yellow solid. $^1$H NMR in C$_6$D$_6$ showed a purity factor of 83.

Run 20: Reaction of Lig$^1$-Mg(DME) with HfCl$_4$ in toluene. Solid Lig$^1$-Mg(DME) (from Run 15) (12.0 g; 25.4 mmol) was dumped into a rapidly stirring slurry of HfCl$_4$ (8.12 g; 25.4 mmol) in toluene (~65 mL). The reaction turned yellow and was stirred for 1 hour at room temperature. The reaction was allowed to settle briefly and an aliquot removed, dried down and $^1$H NMR taken, PF=61. The remaining slurry was dried down under vacuum at 50° C. The residue was extracted with 3×50 mL pentane. The combined extracts were dried down to give a yellow solid. Yield=9.0 g; 58% $^1$H NMR in C$_6$D$_6$, Purity Factor=85.

Run 21: Reaction of Lig$^1$-Mg(DME) with HfCl$_4$ in Toluene at High Temperature. Lig$^1$-Mg(DME) (0.86g; 1.82 mmol) was added to toluene (~40 mL) and heated to 93° C. to form a colorless solution. Solid HfCl$_4$ (0.59 g; 1.84 mmol) was added in with stirring. The solution was stirred for 15 minutes then allowed to cool. The $^1$H NMR of the reaction mixture was taken in d8-THF.

Run 22: Reaction of Lig$^1$-Mg(THF)$_2$ with HfCl$_4$ in Toluene. To Lig$^1$-Mg(THF)$_2$ (0.65 g; 1.23 mmol) slurried in toluene (~10 mL) was added solid HfCl$_4$ (0.39 g; 1.22 mmol) with stirring at room temp. After about 15 minutes there was only a small amount of solids present and a yellow color. After about 75 minutes an aliquot was removed and dried down, the $^1$H NMR in C$_6$D$_6$ showed rac/meso Lig$^1$HfCl$_2$ in about 60% yield and a typical looking impurity with broad peaks in about 40% yield. The toluene was removed under vacuum. The residue extracted with pentane (~8 mL) filtered. An aliquot was removed, dried down and the $^1$H NMR taken in C$_6$D6.

Figure 2:
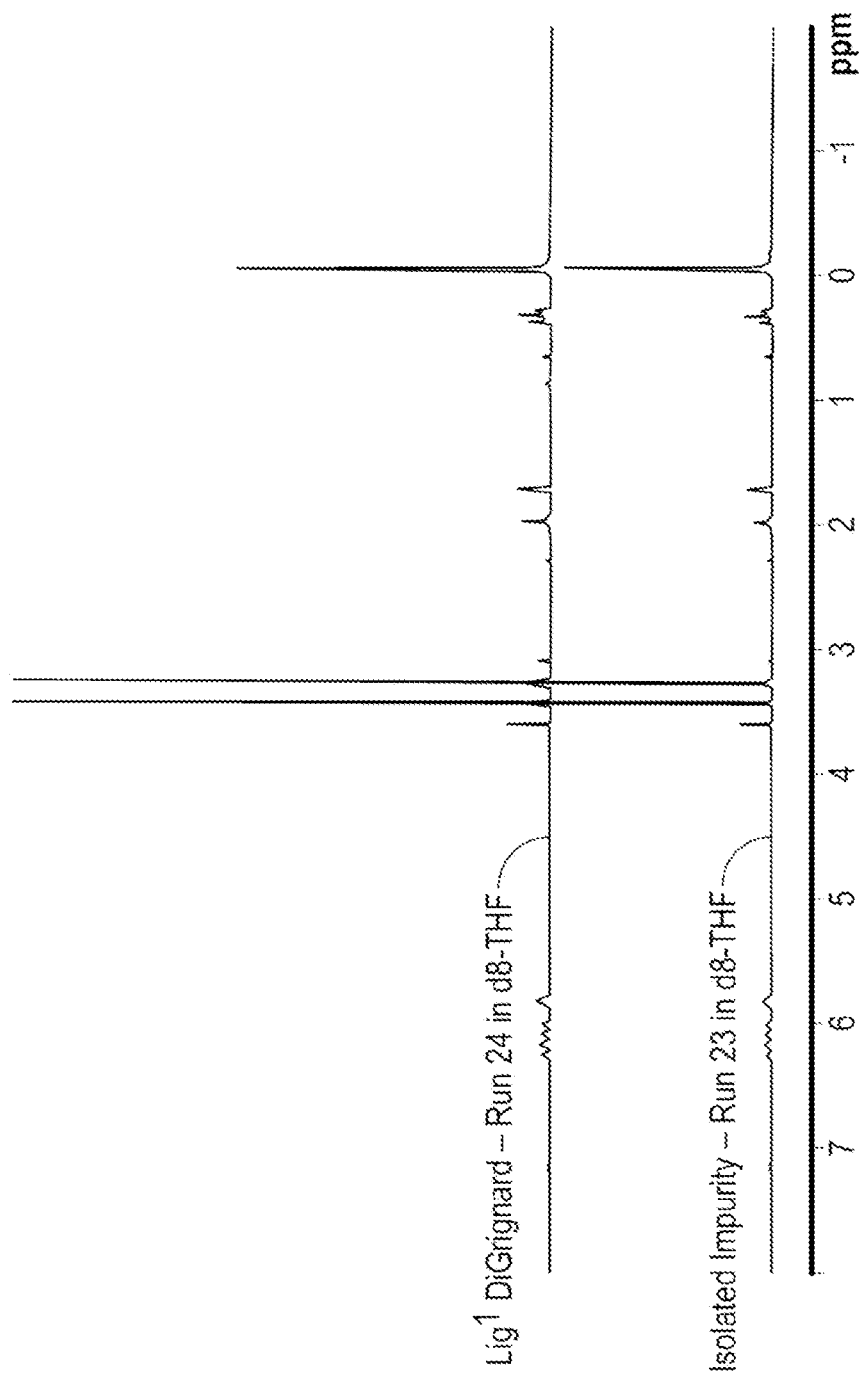
FIG. 2 is a comparison of the $^1$H NMR analyses of the impurity isolated from the reaction mixture from synthesis of $HfCl_2$ from $Me_2Si((Me_3Si)CH_2Cp)_2Mg(DME)$ and $HfCl_4$ in toluene, and the reaction mixture from $Me_2Si((Me_3Si)CH_2Cp)_2$ and a Grignard reagent, as described in Runs 23 and 24, respectively, of the examples below.

Run 23: Reaction of Lig$^1$-Mg(DME) with HfCl$_4$ in Toluene. Solid Lig$^1$-Mg(DME) from Run 16 (17.95 g; 37.9 mmol) was dumped into a rapidly stirring slurry of HfCl$_4$ (12.2 g; 38.1 mmol) in toluene (~80 mL). The reaction turned yellow and was stirred for 2 hours at room temperature. The yellow solution was filtered away from a light yellow colored solid and the solid was washed 2×25 mL with toluene. An aliquot of the toluene solution was dried down and the NMR taken in d8-THF. This showed a rac/meso if 1:1 and a purity factor of 69. The combined toluene filtrates were dried under vacuum at 35° C. and then extracted with iso-hexane (~180 mL) at 35° C. The remaining solid was washed 2×25 mL with isohexane. The isohexane washings and filtrates were combined. An aliquot of the isohexane solution was dried down and the NMR taken in d8-THF. This showed a rac/meso ratio of 1:1 and a purity factor of 86. The entire solution was dried down at 35° C. under vacuum to give a yellow solid. Yield=15.4 g. The isohexane insoluble solid was dried under vacuum to give 5.1 g. The $^1$H NMR of this solid in d8-THF showed fairly clean impurity, as seen in FIG. 2. The originally isolated solid from the initial reaction mixture was washed 2×25 mL with pentane, then dried under vacuum. Yield=7.70 g. Not very soluble in d8-THF (not all solid dissolved).

The results from synthesizing Lig$^1$-HfCl$_2$ from HfCl$_4$ and Lig$^1$-Mg(DME) are summarized in Table B:

TABLE B

Synthesis of Lig$^1$-HfCl$_2$ from the Lig$^1$-Mg(DME) and HfCl$_4$

| Run | Reaction Solvent | Reaction Condition | Reaction Time, min | Purity Factor, Reaction Mix | Purity Factor, C$_5$ Extract |
|---|---|---|---|---|---|
| 18 | toluene | solid HfCl$_4$ added to slurry of Lig$^1$-Mg(DME) | 15 | 61 | 89 |
| 19 | toluene\ trace dioxane | solid HfCl$_4$ added to slurry of Lig$^1$-Mg(DME) | 80 | 67 | 83 |
| 20 | toluene | solid Lig$^1$-Mg(DME) added to slurry of HfCl$_4$ | 60 | 61 | 85 |
| 21 | toluene | solid HfCl$_4$ added to solution of Lig$^1$-Mg (DME) at 85° C. | 15 | 65 | ND |
| 22 | toluene | solid HfCl$_4$ added to slurry of Lig$^1$-Mg(THF)2 | 75 | 59 | 61 |
| 23 | toluene | solid Lig$^1$-Mg(DME) added to slurry of HfCl$_4$ | 120 | 69 | 86 |

Run 24: Synthesis of Lig$^1$ DiGrignard. Lig$^1$ (10.01 g; 27.75 mmol) was dissolved in THF (~18 mL) and iPrMgCl-solution (2.01 M in THF; 26.0 mL; 52.3 mmol) was added. The reaction mixture was heated to 60° C. and stirred 3 hours. An aliquot was dried down, and the $^1$H NMR in d8-THF showed the iPrMgCl had reacted, but the reaction was not particularly clean. About 200 mL pentane was added to the remaining reaction mixture, most of the oily material went into the solution and was decanted off, cooled to −20° C. and an oil formed. The solvent was decanted off the oil and the oil dried down to an off-white foam, which was crushed to an off-white powder, yield=9.2 g. The solid was dissolved in about 20 mL ether, about 120 mL pentane was added, the mixture cooled to −20° C., and an oil formed, which was isolated by decanting and dried under vacuum. The $^1$H NMR in d8-THF looked essentially the same as the off-white powder. About 3.4 g were slurried in about 50 mL pentane and the addition of about 20 mL DME caused an oily solid to form. The solution was concentrated to about 30 mL with heating to precipitate a solid powder, and 30 mL more pentane was added, the solid isolated by filtration, washed with 25 mL pentane and dried under vacuum, yield about 3.2 g. The $^1$H NMR in d8-THF showed 4 DME's total attached and significant clean-up from the previous isolates. The NMR also looked strikingly like the NMR of the impurity isolated in Run 23, suggesting the isolated impurity is the diGrignard. See FIG. 2.

Figure 3:
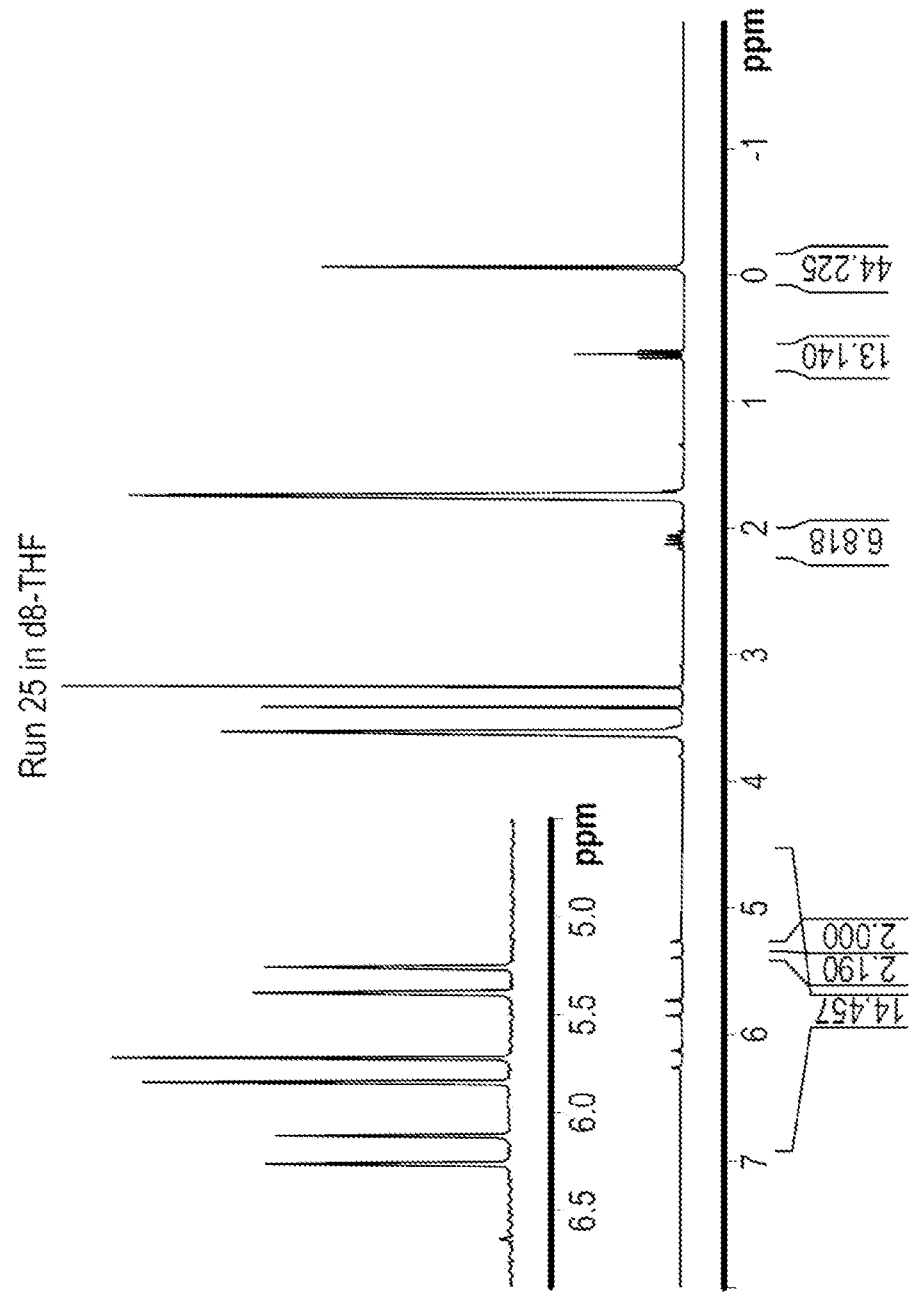
FIG. 3 is a $^1$H NMR analysis of the reaction mixture from the synthesis of $Me_2Si((Me_3SOCH_2Cp)_2HfCl_2$ from the $Me_2Si((Me_3Si)CH_2Cp)_2$diGrignard and $HfCl_4$ in the presence of LiCl according to the present invention in Run 25 of the examples below.

Run 25: Reaction of Lig$^1$ DiGrignard with HfCl$_4$/LiCl. Anhydrous LiCl (0.216 g; 5.09 mmol) was dissolved in THF (~12 mL) and solid Lig$^1$ diGrignard (1.14 g; 1.36 mmol) from Run 24 was added. There was immediate formation of a light pink color. After several minutes an aliquot was removed, dried down and the $^1$H NMR taken in d8-THF. The remainder of the solution was added to a slurry of HfCl$_4$ (0.414g; 1.30 mmol) in ether (~3 ml). The HfCl$_4$ dissolved and a light yellow color formed. After stirring 10 minutes an aliquot was removed, dried down and the $^1$H NMR taken in d8-THF. Purity Factor=87. The $^1$H NMR is shown in FIG. 3.

Run 26: Reaction of Lig$^1$-Mg(DME) with HfCl$_4$/LiCl. Anhydrous LiCl (0.180 g; 4.23 mmol) was mostly dissolved in THF, solid Lig$^1$-Mg(DME) (1.00 g; 2.11 mmol) was added and dissolved, rapidly forming a very light pink solution. After about 20 minutes an aliquot was dried down and the $^1$H NMR in d8-THF looked remarkably like the product from Run 25. The solution was added to a slurry of HfCl$_4$ (0.660 g; 2.06 mmol) in ~4 mL Et$_2$O. The reaction turned light yellow, some of the HfCl$_4$ became gummy and only slowly dissolved over about an hour. After stirring for 2 days, the solution was almost colorless. An aliquot was dried down and the $^1$H NMR taken in d8-THF. Purity Factor=84.

Run 27: Reaction of Lig$^1$-Mg(DME) with HfCl$_4$/LiCl. Anhydrous LiCl (0.100 g; 2.36 mmol) was dissolved in THF (~5 mL) and Lig$^1$-Mg(DME) (1.10 g; 2.32 mmol) was added as a solid and rapidly dissolved to form a very light pink solution. The reaction was stirred 15 minutes and the solution was added to HfCl$_4$ (0.772; 2.25 mmol) in Et2O (~5mL) with rapid. stirring, and the color became bright yellow, similar to reactions in which the Lig$^1$-Li$_2$ dianion had significant impurities, and much stronger yellow than Runs 25 and 26 in which 2 equivalents of LiCl was added. The reaction was stirred for 3 hours at room temperature, over which the intensity of the yellow color appeared to decrease some. An aliquot was removed, dried down, and the $^1$H NMR taken in d8-THF. Purity Factor=78.

Run 28: Reaction of Lig$^1$-Mg(DME) with HfCl$_4$/LiCl. Anhydrous LiCl (0.0975 g; 2.30 mmol) was added to DME (~5 mL) and stirred for 20 minutes at RT. Most of the LiCl appeared to be undissolved. Lig$^1$-Mg(DME) (1.08 g; 2.28 mmol) was added to form a slurry, which was stirred for 30 minutes at room temperature. Solid HfCl$_4$ (0.732 g; 2.29 mmol) was added, and the resulting light yellow slurry was stirred for 1 hour. An aliquot was removed, dried down, extracted into pentane, filtered to give a yellow solution, and dried down. $^1$H NMR in C$_6$D$_6$ (18-AC$_{2560}$-A) showed the presence of unreacted Lig$^1$-Mg(DME).

Run 29: Reaction of Lig$^1$-Mg(DME) with HfCl$_4$/LiCl. Anhydrous LiCl (0.260 g; 6.13 mmol) was dissolved in THF (~5 mL) at RT. Solid HfCl$_4$ (0.935 g; 2.92 mmol) was added and quickly dissolved with warming. After stirring about 10 minutes, solid Lig$^1$-Mg(DME) (1.38 g; 2.92 mmol) was added which quickly dissolved to form a yellow solution. The reaction was stirred for 1 hour at room temperature. NMR in d8-THF gave PF=88.

Figure 4:
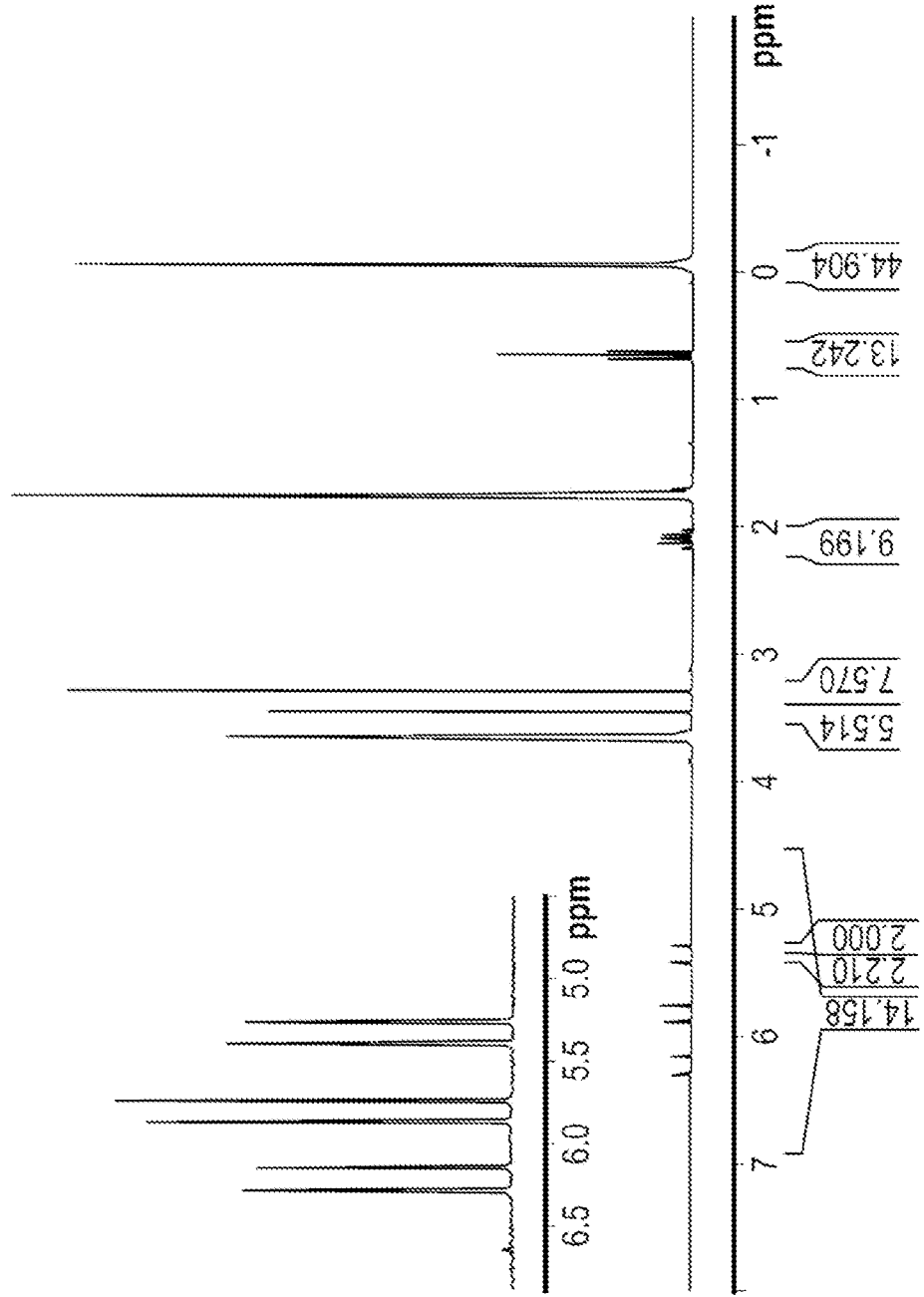
FIG. 4 is a $^1$H NMR analysis of the reaction mixture from the synthesis of $Me_2Si((Me_3SOCH_2Cp)_2HfCl_2$ from $Me_2Si((Me_3Si)CH_2Cp)_2Mg(DME)$ and $HfCl_4$ in the presence of LiCl according to the present invention in Run 30 of the examples below.

Run 30: Reaction of Lig$^1$-Mg(DME) with HfCl$_4$/LiCl. Anhydrous LiCl (0.192 g; 4.53 mmol) and solid Lig$^1$-Mg (DME) from Run 18 (1.01 g; 2.13 mmol) were added together and dissolved in THF (~5 mL) with stirring. After several minutes solid HfCl$_4$ (0.682 g; 2.13 mmol) was added, a yellow solution formed and stirring continued for 90 minutes, during which the yellow color decreased. $^1$H NMR of a dried down aliquot taken in d8-THF showed Purity Factor=89. The $^1$H NMR is shown in FIG. 4.

Run 31: Reaction of Lig$^1$-Mg(DME) with HfCl$_4$/LiCl. Anhydrous LiCl (0.171 g; 4.03 mmol) and solid Lig$^1$-Mg (DME) from Run 18 (0.90 g; 1.92 mmol) were added together and dissolved in THF (~5mL). The solution was cooled to −20° C. and then placed in a cold bath at −20° C. Solid HfCl$_4$ (0.614 g; 1.92 mmol) was added, a yellow solution formed, and the reaction was allowed to warm to room temperature and stirred for 65 minutes. $^1$H NMR of a dried down aliquot taken in d8-THF (18-AC$_{2565}$-A) showed Purity Factor=83.

Run 32: Reaction of Lig$^1$-Mg(DME) with HfCl$_4$/LiCl. Anhydrous LiCl (2.91 g; 68.6 mmol) and solid Lig$^1$-Mg (DME) from Run 19 (15.46 g; 32.67 mmol) were added together and dissolved in THF (75mL). Solid HfCl$_4$ (10.46 g; 32.66 mmol) was added, a yellow solution formed, and the reaction warmed considerably. After 90 minutes during which the intensity of the yellow decreased to a very lightly pale yellow, an aliquot was removed, dried down, and the $^1$H NMR taken in d8-THF (18-AC$_{2566}$-A). Purity Factor=89.

The THF was removed under vacuum at 40° C. The almost colorless solid was extracted with pentane (180 mL) by stirring vigorously for 20 minutes. The very light yellow solution was isolated by filtration and the remaining solid was extracted with pentane (80 mL) by stirring vigorously for 20 minutes. The combined filtrates were dried under vacuum at 40° C. to give an almost colorless solid containing some gummy material. Yield=16.05 g; 80.8% yield. The solid was extracted with iso-hexane (40 mL) stirring vigorously at 65° C., filtered hot, and a colorless crystalline solid immediately precipitated. The solid was again extracted with iso-hexane (40 mL) stirring vigorously at 65° C. and the filtrates combined and dried down. Yield=2.70 g; $^1$H NMR in C$_6$D$_6$ (18-AC$_{2566}$-C) showed Purity Factor=87; rac/meso=1:1.02.

Run 33: Reaction of Lig$^1$-Mg(DME) with HfCl$_4$ in THF without LiCl. Lig$^1$-Mg(DME) (18-AC2550) from Run 16 (0.790 g; 1.67 mmol) was dissolved in THF (~5 mL), solid HfCl$_4$ (0.53 g; 1.67 mmol) was added with rapid stirring, and the reaction turned light yellow and a precipitate formed rapidly. The reaction was stirred 20 minutes. An aliquot was removed, dried down and showed very low yield by $^1$H NMR.

Figure 5:
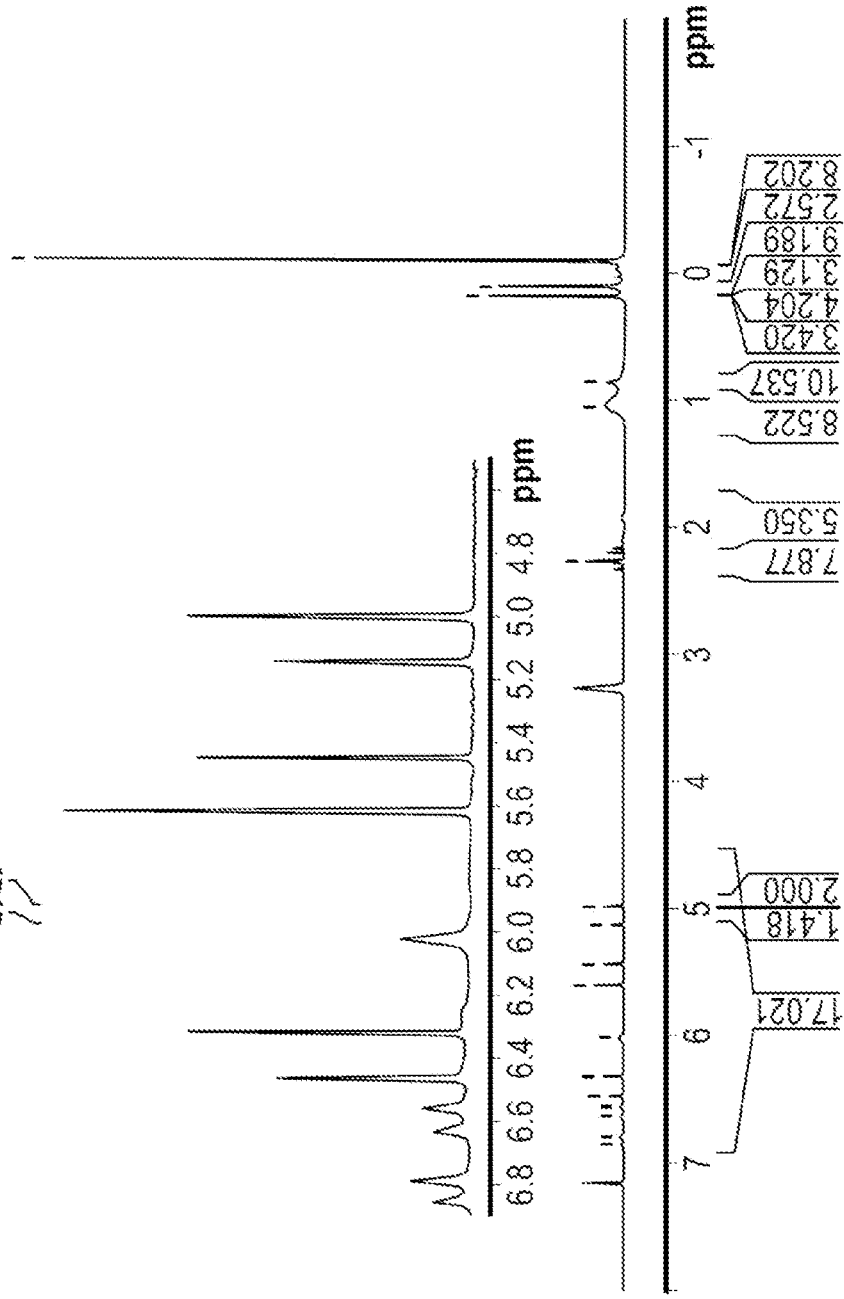
FIG. 5 is a $^1$H NMR analysis of the reaction mixture from the synthesis of $Me_2Si((Me_3SOCH_2Cp)_2HfCl_2$ from $Me_2Si((Me_3Si)CH_2Cp)_2Mg(DME)$ and $HfCl_4$ without LiCl, as described in Run 34 of the examples below.

Run 34: Reaction of Lig$^1$-Mg(DME) with HfCl$_4$ in Ether without LiCl. Lig$^1$-Mg(DME) (1.37 g; 2.90 mmol) was slurried in ~30 mL ether. Solid HfCl$_4$ (0.93 g; 2.90 mmol) was added in one portion, and after several minutes the reaction mixture turned yellow. After 40 minutes of stirring at room temperature, the reaction was allowed to settle and an aliquot removed. $^1$H NMR (17-AC2528-A) in C$_6$D$_6$ showed formation of product with a purity factor of 60 as seen in FIG. 5 but the reaction did not appear to be complete. After 2 hours another aliquot was removed and the $^1$H NMR in C$_6$D$_6$ showed no change. After stirring overnight, two aliquots were removed and the $^1$H NMR in C$_6$D$_6$ still showed no change.

TABLE C

Synthesis of Lig$^1$-HfCl$_2$ from Lig$^1$-Mg(DME) and HfCl$_4$/LiCl

| Run | LiCl/Lig$^1$-Mg (DME), mol/mol | Solvent | Reaction Condition | Reaction Time | PF, Reaction Mix |
|---|---|---|---|---|---|
| 25 | 3.7 | THF | Lig$^1$ DiGrignard added to HfCl$_4$/Et$_2$O slurry | 10 min | 87 |
| 26 | 2 | THF | Lig$^1$-Mg added to HfCl$_4$ slurry in Et$_2$O | 3 d | 84 |
| 27 | 1 | THF | Lig$^1$-Mg added to HfCl$_4$ slurry in Et$_2$O | 3 h | 78 |
| 28 | 1 | DME | solid HfCl$_4$ added to DME slurry of LiCl/Lig$^1$-Mg | 1 h | low |
| 29 | 2 | none | LiCl(sol) in THF, then HfCl$_4$ added then Lig$^1$-Mg | 1 h | 88 |
| 30 | 2 | THF | LiCl(s) and Lig$^1$-Mg(s) together in THF; then HfCl$_4$ (sol/s) added | 1.5 h | 89 |
| 31 | 2 | THF | Same as Run 29, but at −20° C. | 65 min | 83 |
| 32 | 2 | THF | Same as Run 29; larger scale | 1.5 h | 89 |
| 33 | 0 | THF | HfCl$_4$(s) added to THF (sol) of Lig$^1$-Mg | 20 min | low |
| 34 | 0 | Et$_2$O | HfCl$_4$ (s) added to Et$_2$O slurry of Lig$^1$-Mg | 40 min | 60 |
| 35 | 0 | C$_5$/DME | Lig$^1$-Mg (sol) in DME added to C$_5$/DME slurry of HfCl$_4$ | 60 min | 30 |

Run 35: Reaction of Lig$^1$-Mg(DME) with HfCl$_4$ in Pentane/DME without LiCl. HfCl$_4$ (0.68 g; 2.1 mmol) was slurried in pentane (~15 mL) and DME (~10 mL) was added. To the resulting stirring slurry was added Lig$^1$Mg(DME) (1.00 g; 2.1 mmol) dissolved in DME (~30 mL). The slurry was stirred for ~1 hour and an aliquot containing both liquid and solid (~5 mL) was removed, dried down and the $^1$H NMR taken in C$_6$D$_6$. The reaction was stirred over the weekend at room temperature. The solvent was removed under vacuum and the residue extracted 3×10 mL with pentane. An aliquot was dried down and the $^1$H NMR taken in C$_6$D$_6$.

The results from synthesizing Lig$^1$-HfCl$_2$ from Lig$^1$-Mg (DME) and HfCl$_4$/LiCl are summarized in Table C.

Figure 6:
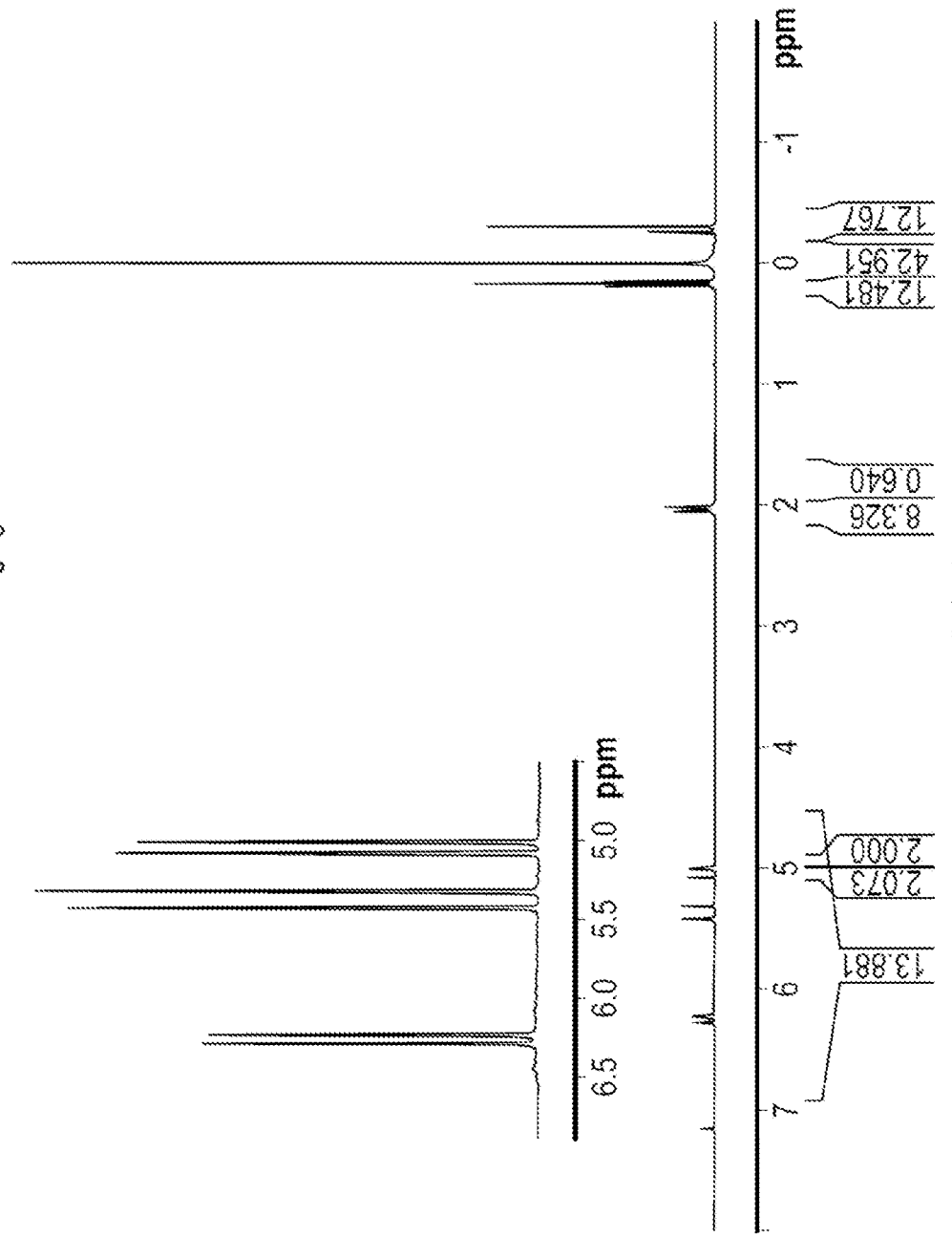
FIG. 6 is a $^1$H NMR analysis of the $Me_2Si((Me_3Si)CH_2Cp)_2HfMe_2$ product from $Me_2Si((Me_3Si)CH_2Cp)_2Mg(DME)$ and $HfCl_4$ in the presence of LiCl followed by in-situ methylation according to the present invention, as described in Run 36 of the examples below.

Run 36: Reaction of Lig$^1$-Mg(DME) with HfCl$_4$/LiCl Followed by In-Situ Methylation. Anhydrous LiCl (1.70 g; 40.1 mmol) and solid Lig$^1$-Mg(DME) (8.920 g; 18.85 mmol; combination of three batches, mostly from Run 18 were combined in a flask and dissolved in THF (~40 mL) with stirring. Solid HfCl$_4$ (6.04 g; 18.85 mmol) was added, the reaction turned yellow and warmed. The reaction was stirred 90 minutes and became less yellow. To the stirring reaction was added MeMgBr (13.2 mL; 2.95 M in ether; 37.7 mmol) in 4 portions of 3.20 mL over a minute. The color turned from light yellow to light gray. After stirring for 20 minutes an aliquot was removed, dried down and the $^1$H NMR taken in d8-THF showed the reaction was complete. Purity Factor=81. After a total of 35 minutes stirring the solvent was removed under vacuum. Iso-hexane (~90 mL) was added and the flask warmed to 50° C. The solids formed were gummy and clung to the side of the flask. The slightly cloudy solution was decanted off and additional iso-hexane (~45 mL) was added to the remaining solids with stirring at 50° C. This solution was decanted and combined with the first and dried down at 50° C. The isolated solid weighed 9.70 g; 0.320 g of this was dissolved in 3 mL C$_6$D$_6$ for NMR with some cloudiness. Purity Factor=84. The remaining isolated solid was dissolved in pentane (45 mL), and an estimated 200 mg of salt remained undissolved. The solution was filtered to give a clear, light yellow solution that was dried down. Yield=9.25 g. Taking into account the 0.32 g removed for NMR, the calculated overall yield is 9.63 g; 89%; Purity Factor=88. The $^1$H NMR is shown in FIG. 6.

Run 37: Reaction of Lig$^1$-Mg(DME)/2 LiCl with ZrCl$_4$ Followed by In-Situ Methylation. Solid Lig$^1$-Mg(DME) (1.33 g; 2.81 mmol) and anhydrous LiCl (0.250 g; 5.90 mmol) were combined together and THF (~5 mL) was added, stirred for about 10 minutes to form a clear solution and solid ZrCl$_4$ (0.655 g; 2.81 mmol) was added in one portion, forming an orange solution. The reaction was stirred at room temp for 2 hours at which time the color was light yellow. About 0.5 mL was removed, dried down and the $^1$H NMR taken in d8-THF. Purity Factor=82. To the remaining solution was added MeMgBr (1.68 mL; 5.04 mmol; 3.0 M in ether). The reaction turned light brown. After stirring 30 minutes the reaction was dried down under vacuum, extracted with 10 mL iso-hexane at 60° C., and the solution isolated by decanting. The remaining gooey solid was extracted with an additional 5 mL of iso-hexane and the solution isolated by decanting. The combined solutions were dried down and redissolved in 5 mL of warm iso-hexane, filtered, and the filter was washed with 2 mL of warm isohexane. The combined solutions were dried under vacuum at 60° C. to give a light brown colored solid. Yield=0.94 g.$^1$H NMR taken in C$_6$D$_6$ showed Purity Factor=85.

Run 38: Reaction of Lig$^1$-Mg(DME)/$_2$ LiCl with HfCl$_4$ Followed by In-Situ Methylation. Lig$^1$-Mg(DME) (64.26 g, 136 mmol) and anhydrous LiCl (12.2 g; 287 mmol) were combined as solids and THF (240 mL) was added. After stirring for 15 minutes the Lig$^1$-Mg(DME) and nearly all the LiCl had dissolved. Solid HfCl$_4$ (43.5 g; 136 mmol) was added rapidly to the solution with vigorous stirring. The solution turned yellow and warmed. There were chunks of solid HfCl$_4$ that took up to 20 minutes to dissolve. After 2.75 hours an aliquot was removed, dried down and the NMR taken in d8-THF showed PF=85. To the solution was added MeMgBr (88.7 mL; 257 mmol; 2.95 M in ether) in 9 portions over several minutes, the solution warmed and turned grey. This was stirred 25 minutes then the volatiles were removed under vacuum at 50° C. jacket temperature. This gave a thick off-white gooey material, to which 160 mL of iso-hexane was added. This flask was stirred by swirling vigorously by hand to get the gooey material moving. It was heated to 50° C. with intermittent swirling, then a yellow, cloudy solution was decanted off. An additional 80 mL of iso-hexane was added and the process was repeated, followed by a rinse of the gooey material with 10 mL iso-hexane. The combined solutions were dried down to a solid. This solid was dissolved in pentane (~300 mL) and filtered to give a clear yellow solution. There was a very small amount of solid recovered from the frit. An aliquot of the pentane solution was dried down and the $^1$H NMR taken in d8-THF showed Purity Factor=87. The pentane was dried down to give an off-white solid. Isolated Yield=67.0 g; 118 mmol; 87% from Lig$^1$-Mg(DME). The solid was ground into a powder, and the $^1$H NMR in C$_6$D$_6$ showed Purity Factor=87. The purity was 87 wt % based on $^1$H NMR using an internal standard.

Run 39: Synthesis of Lig$^1$ZrCl$_2$ from Lig$^1$Li$_2$. The Lig$^1$Li$_2$ dianion (0.50 g; 1.3 mmol) was slurried in Et2O (~25 mL) and solid ZrCl$_4$ (0.31 g; 1.3 mmol) was added. The reaction was stirred overnight at room temperature. The solvent was evaporated off and the residue was extracted with pentane (~15 mL) and filtered to give a yellow/orange solution. An aliquot was dried down and the $^1$H NMR taken in C$_6$D6 showed purity factor=62.

Run 40 Reaction of Lig$^1$-Mg(DME)/2 LiCl with HfCl$_4$ Followed by Methylation in a Second Step. Lig$^1$-Mg(DME) (59.62 g, 126 mmol) and anhydrous LiCl (11.2 g; 264 mmol, 2.1 equ) were combined as solids and THF (250 mL) was added. After stirring for 15 minutes the Lig$^1$-Mg(DME) and nearly all the LiCl had dissolved. Solid HfCl$_4$ (40.36 g; 136 mmol) was slowly added as the mixture temperature cooled down to room temperature. After 2 hours and 45 minutes all volatiles were removed and the crude materials were extracted into dichloromethane, the solution isolated by filtration. All volatiles from the solution were removed in vacuo and the product was dissolved in diethylether (300 mL) and cooled to −25° C. To this, a solution of MeMgBr (88 mL, 252 mmol) was added dropwise over a period of 20 to 25 minutes. The resulting mixture was stirred overnight at room temperature and aliquot was tested to ensure completion of reaction. All volatiles from the reaction mixture were removed under vacuum and extracted into hexane several times. The solvent was removed from the combined filtrates and the purity was determined to be 85 wt % by use of $^1$H NMR with an added internal standard.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process comprising:
  (i) reacting a bridged dicyclopentadienyl dianion-alkaline earth metal-Lewis base complex with a Group 4 metal tetrahalide in the presence of an alkali metal halide; and
  (ii) forming a Group 4 ansa-metallocene dihalide.

2. The process of claim 1, wherein the bridged dicyclopentadienyl dianion-alkaline earth metal-Lewis base complex is represented by the formula (A):

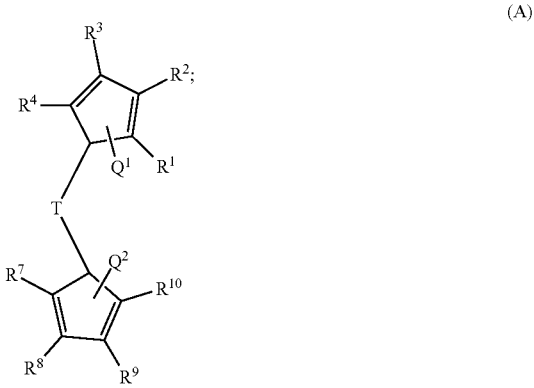

where each $R^1$, $R^2$, $R^3$ and $R^4$ and $R^7$, $R^8$, $R^9$ and $R^{10}$ is independently hydrogen, alkoxide, a $C_1$ to $C_{40}$ substituted or unsubstituted hydrocarbyl group, optionally where any two or more of $R^1$, $R^2$, $R^3$ and $R^4$ or two or more of $R^7$, $R^8$, $R^9$ and $R^{10}$ join to form a substituted or unsubstituted, saturated, partially unsaturated or aromatic, cyclic or polycyclic substituent, where at least one of $R^1$, $R^2$, $R^3$, $R^4$, $R^7$, $R^8$, $R^9$ and $R^{10}$ is independently —CH$_2$—SiR'$_3$ or —CH$_2$—CR'$_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group; and
together $Q^1$ and $Q^2$ are a divalent alkaline earth metal complexed with a Lewis base, according to the formula (D1), or each $Q^1$ and $Q^2$ is independently an alkaline earth metal cation as would be formed by reacting a neutral bridged dicyclopentadienyl ligand with a Grignard reagent and complexing with a Lewis base, according to the formula (D2), wherein the formulae (D1) and (D2) are:

$$>M^1L^1L^2 \qquad (D1);$$

$$-M^1X^1L^1L^2 \qquad (D2);$$

where ">" indicates a divalent complex and "−" indicates a monovalent complex;
$M^1$ is an alkaline earth metal;
where $M^1$ is an alkaline earth metal;
$X^1$ is halogen; and
together $L^1$ and $L^2$ are a difunctional Lewis base, or each $L^1$ and $L^2$ is independently a monofunctional Lewis base;
wherein the Group 4 metal tetrahalide is represented by the formula (B):

$$M^2X^2_4 \qquad (B),$$

where $M^2$ is a Group 4 transition metal; and
each $X^2$ is independently halogen; and
wherein the alkali metal halide is represented by the formula (C):

$$M^3X^3 \qquad (C),$$

where $M^3$ is an alkali metal and $X^3$ is independently halogen.

3. The process of claim 2, wherein:
  each $R^1$ and $R^4$ is independently hydrogen, alkoxide or a $C_1$ to $C_{40}$ substituted or unsubstituted hydrocarbyl group;
  each $R^2$, $R^3$, $R^8$, and $R^9$ is independently hydrogen, alkoxide or a $C_1$ to $C_{40}$ substituted or unsubstituted hydrocarbyl group or is —CH$_2$—SiR'$_3$ or —CH$_2$—CR'$_3$, and each R is independently hydrogen or a $C_1$ to $C_{20}$ substituted or unsubstituted hydrocarbyl, provided that at least one R' is not H and at least one of $R^2$ and $R^3$ is —CH$_2$—SiR'$_3$ or —CH$_2$—CR$_3$;
  each $R^7$ and $R^{19}$ is independently hydrogen, alkoxide or a $C_1$ to $C_{40}$ substituted or unsubstituted hydrocarbyl group; and
  T is a bridging group comprising a group 14 atom and one or more of hydrogen, a $C_1$-$C_{10}$ linear hydrocarbyl group, or substituted hydrocarbyl group.

4. The process of claim 1, wherein the reaction in (i) is in a fluid medium comprising a Lewis base.

5. The process of claim 1, wherein an initial molar ratio of the alkali metal halide to the bridged dicyclopentadienyl dianion-alkaline earth metal-Lewis base complex in the reaction in (i) is equal to or greater than 1.

6. The process of claim 1, wherein the Group 4 ansa-metallocene dihalide from (ii) has a purity equal to or greater than 70 weight percent wherein the purity is determined on a solvent-free basis by quantitative $^1$H NMR in using an internal standard.

7. The process of claim 1, further comprising alkylating the Group 4 ansa-metallocene dihalide from (ii).

8. The process of claim 1 further comprising:
  deprotonating a neutral bridged dicyclopentadienyl ligand with an alkaline earth metal compound to form a corresponding dianion, wherein the neutral bridged dicyclopentadienyl ligand has the formula (F) or is an isomer of the formula (F):

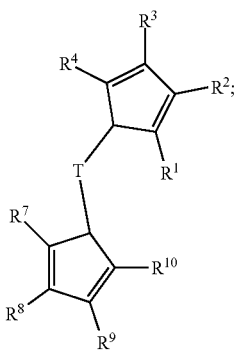

(F)

where each $R^1$, $R^2$, $R^3$ and $R^4$ and $R^7$, $R^8$, $R^9$ and $R^{10}$ is independently hydrogen, alkoxide, a $C_1$ to $C_{40}$ substituted or unsubstituted hydrocarbyl group, optionally where any two or more of $R^1$, $R^2$, $R^3$ and $R^4$ or two or more of $R^7$, $R^8$, $R^9$ and $R^{10}$, join to form a substituted or unsubstituted, saturated, partially unsaturated or aromatic, cyclic or polycyclic substituent, where at least one of $R^1$, $R^2$, $R^3$, $R^4$, $R^7$, $R^8$, $R^9$ and $R^{10}$ is independently $-CH_2-SiR'_3$ or $-CH_2-CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent; and T is a bridging group; and complexing the corresponding dianion with a Lewis base to form the bridged dicyclopentadienyl dianion-alkaline earth metal-Lewis base complex for the reaction (i).

9. The process of claim 8, wherein the alkaline earth metal compound in the deprotonation is an alkaline earth metal dialkyl and the bridged dicyclopentadienyl dianion-alkaline earth metal-Lewis base complex comprises alkaline earth metal metallocene, according to formula (A1):

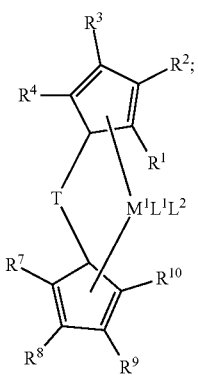

(A1)

where T, $R^1$, $R^2$, $R^3$ and $R^4$ and $R^7$, $R^8$, $R^9$ and $R^{10}$ are as defined in claim 8;

$M^1$ is an alkaline earth metal; and together $L^1$ and $L^2$ are a difunctional Lewis base, or each $L^1$ and $L^2$ is independently a monofunctional Lewis base.

10. The process of claim 8, wherein the alkaline earth metal compound in the deprotonation is a Grignard reagent, and the dianion comprises a diGrignard product.

11. The process of claim 8, further comprising reacting a monocyclopentadiene anion with a bridging group compound to form the neutral bridged dicyclopentadienyl ligand.

12. The process of claim 1, wherein the Group 4 ansa-metallocene dihalide formed in (ii) is according to the formula (E1):

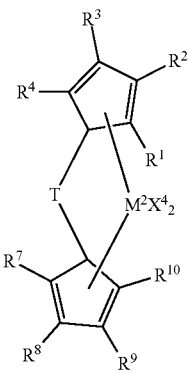

(E1)

where $M^2$ is a Group 4 transition metal;

each $R^1$, $R^2$, $R^3$ and $R^4$ and $R^7$, $R^8$, $R^9$ and $R^{10}$ is independently hydrogen, alkoxide, a $C_1$ to $C_{40}$ substituted or unsubstituted hydrocarbyl group, optionally where any two or more of $R^1$, $R^2$, $R^3$ and $R^4$ or two or more of $R^7$, $R^8$, $R^9$ and $R^{10}$, join to form a substituted or unsubstituted, saturated, partially unsaturated or aromatic, cyclic or polycyclic substituent, where at least one of $R^1$, $R^2$, $R^3$, $R^4$, $R^7$, $R^8$, $R^9$ and $R^{10}$ is independently $-CH_2-SiR'_3$ or $-CH_2-CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent;

T is a bridging group; and each $X^4$ is independently a univalent anionic ligand, or two $X^4$ are joined and bound to the metal atom to form a metallocycle ring, or two $X^4$ are joined to form a chelating ligand, a diene ligand, or an alkylidene ligand.

13. A process for synthesizing a Group 4 ansa-metallocene comprising:

(a) deprotonating a neutral bridged dicyclopentadienyl ligand with an alkaline earth metal compound selected from alkaline earth metal dialkyls and Grignard reagents to form the corresponding dianion comprising the alkaline earth metal, wherein the neutral bridged dicyclopentadienyl ligand is according to formula (F) or is an isomer of the formula (F):

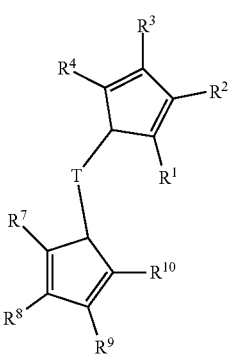

(F)

where each $R^1$, $R^2$, $R^3$ and $R^4$ and $R^7$, $R^8$, $R^9$ and $R^{10}$ is independently hydrogen, alkoxide, a $C_1$ to $C_{40}$ substituted or unsubstituted hydrocarbyl group, optionally where any two or more of $R^1$, $R^2$, $R^3$ and $R^4$ or two or more of $R^7$, $R^8$, $R^9$ and $R^{10}$, join to form a substituted or unsubstituted, saturated, partially unsaturated or aromatic, cyclic or polycyclic substituent, where at least one of $R^1$, $R^2$, $R^3$, $R^4$, $R^7$, $R^8$, $R^9$ and $R^{10}$ is independently —$CH_2$—$SiR'_3$ or —$CH_2$—$CR'_3$ where each R' is independently hydrogen or a $C_1$ to $C_{20}$ substituted or unsubstituted hydrocarbyl, optionally where any two or more of R' join to form a substituted or unsubstituted, saturated, partially unsaturated or aromatic, cyclic or polycyclic substituent, provided that at least one R is not H; and T is a bridging group;

(b) complexing the dianion from (a) with a Lewis base to form a bridged dicyclopentadienyl dianion-alkaline earth metal-Lewis base complex;

(c) reacting the bridged dicyclopentadienyl dianion-alkaline earth metal-Lewis base complex from (b) with a Group 4 metal tetrahalide in a fluid medium comprising an alkali metal halide and a solvent;

(d) forming Group 4 ansa-metallocene according to the formula (E):

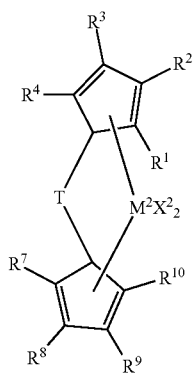

(E)

where T, $R^1$, $R^2$, $R^3$ and $R^4$ and $R^7$, $R^8$, $R^9$ and $R^{10}$ are as defined above;

$M^2$ is the Group 4 metal;

each $X^2$ is independently halogen; and (e) optionally alkylating the Group 4 ansa-metallocene from (d) with an alkylating agent to form the Group 4 ansa-metallocene according to the formula (E1):

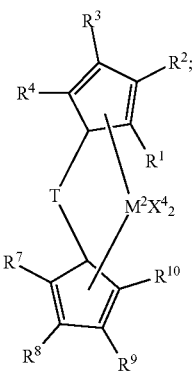

(E1)

where T, $R^1$, $R^2$, $R^3$ and $R^7$, $R^8$, $R^9$ and $R^{10}$, and $M^2$ are as defined above; and each $X^4$ is independently a univalent anionic ligand, or two $X^4$ are joined and bound to the metal atom to form a metallocycle ring, or two $X^4$ are joined to form a chelating ligand, a diene ligand, or an alkylidene ligand.

14. The process of claim 13, wherein the reaction in (c) and the alkylation in (e) are in the same reactor, optionally without isolating the Group 4 ansa-metallocene between (c) and (e).

15. The process of claim 13, further comprising solvent extraction of the Group 4 ansa-metallocene formed in (d).

16. The process of claim 13, wherein an initial molar ratio of the alkali metal halide to the bridged dicyclopentadienyl dianion-alkaline earth metal-Lewis base complex in the reaction in (c) is equal to or greater than 1.

17. The process of claim 13, wherein the alkaline earth metal compound in the deprotonation in (a) is an alkaline earth metal dialkyl and the dianion comprises alkaline earth metal metallocene.

18. The process of claim 13, wherein the alkaline earth metal compound in the deprotonation in (a) is a Grignard reagent and the dianion comprises a diGrignard product.

19. The process of claim 13 comprising the alkylation of (e) and wherein in the formula (E1):

each $R^1$, $R^2$, $R^4$, $R^7$, $R^8$, and $R^{10}$ is independently hydrogen, or a $C_1$ to $C_{40}$ substituted or unsubstituted hydrocarbyl group; and each $R^3$ and $R^9$ is independently a $C_1$ to $C_{40}$ substituted or unsubstituted hydrocarbyl group, or is —$R^{20}$—$SiR'_3$ or —$R^{20}$—$CR'_3$ where $R^{29}$ is a $C_1$ to $C_4$ hydrocarbyl, and each R' is independently hydrogen or a $C_1$ to $C_{20}$ substituted or unsubstituted hydrocarbyl.

20. The process of claim 19, wherein:

$M^2$ is Hf, or $M^2$ is Zr;

each $R^1$, $R^2$, $R^4$, $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group; and each $R^3$ and $R^9$ is independently —$R^{20}$—$SiR'_3$ or —$R^{20}$—$CR'_3$ where $R^{20}$ is a $C_1$ to $C_4$ hydrocarbyl and R' is a $C_1$ to $C_{20}$ substituted or unsubstituted hydrocarbyl.

* * * * *